United States Patent
Hiroya et al.

(10) Patent No.: US 8,416,287 B2
(45) Date of Patent: Apr. 9, 2013

(54) DISPLAY DEVICE AND TERMINAL UNIT USING THE SAME

(75) Inventors: Tsutomu Hiroya, Kanagawa (JP); Shinichi Uehara, Kanagawa (JP); Koji Shigemura, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 1109 days.

(21) Appl. No.: 12/277,478

(22) Filed: Nov. 25, 2008

(65) Prior Publication Data

US 2009/0168167 A1 Jul. 2, 2009

(30) Foreign Application Priority Data

Dec. 26, 2007 (JP) ................................. 2007-335404

(51) Int. Cl.
*G02B 27/22* (2006.01)
(52) U.S. Cl. .......................................... 348/54; 348/59
(58) Field of Classification Search ................ 348/54–60
See application file for complete search history.

(56) References Cited

U.S. PATENT DOCUMENTS

| | | | | |
|---|---|---|---|---|
| 7,864,285 B2* | 1/2011 | Liao et al. | .............. | 349/156 |
| 8,054,548 B2* | 11/2011 | Uehara et al. | .............. | 359/463 |
| 8,064,010 B2* | 11/2011 | Uehara et al. | .............. | 349/106 |
| 8,102,499 B2* | 1/2012 | Liao et al. | .............. | 349/156 |
| 2008/0252821 A1* | 10/2008 | Liao et al. | .............. | 349/86 |
| 2009/0273746 A1* | 11/2009 | Uehara et al. | .............. | 349/106 |
| 2011/0051236 A1* | 3/2011 | Uehara et al. | .............. | 359/462 |
| 2011/0069272 A1* | 3/2011 | Liao et al. | .............. | 349/190 |

FOREIGN PATENT DOCUMENTS

| | | |
|---|---|---|
| JP | 07-005417 | 1/1995 |
| JP | 2004-280052 | 10/2004 |

* cited by examiner

*Primary Examiner* — Kenneth R Coulter
(74) *Attorney, Agent, or Firm* — Young & Thompson

(57) ABSTRACT

A display device reduces the image quality degradations by suppressing the effect of the defective alignment regions caused by the spacers while minimizing the aperture ratio lowering, and prevents the image quality change dependent on the observation positions. The display device has a display panel and a lenticular lens. Each unit pixel of the display panel includes the sub-pixel for the left eye and the sub-pixel for the right eye. To keep the pair of substrates at a predetermined gap, spacers are arranged at predetermined positions in the gap. The spacers are stripe-shaped and extended along a direction perpendicular to the image separation axis of the lenticular lens. The spacers are equally overlapped with the sub-pixels for the left eye and those for the right eye. The spacers may be isolated for the respective unit pixels, or the first or second sub-pixels.

23 Claims, 27 Drawing Sheets

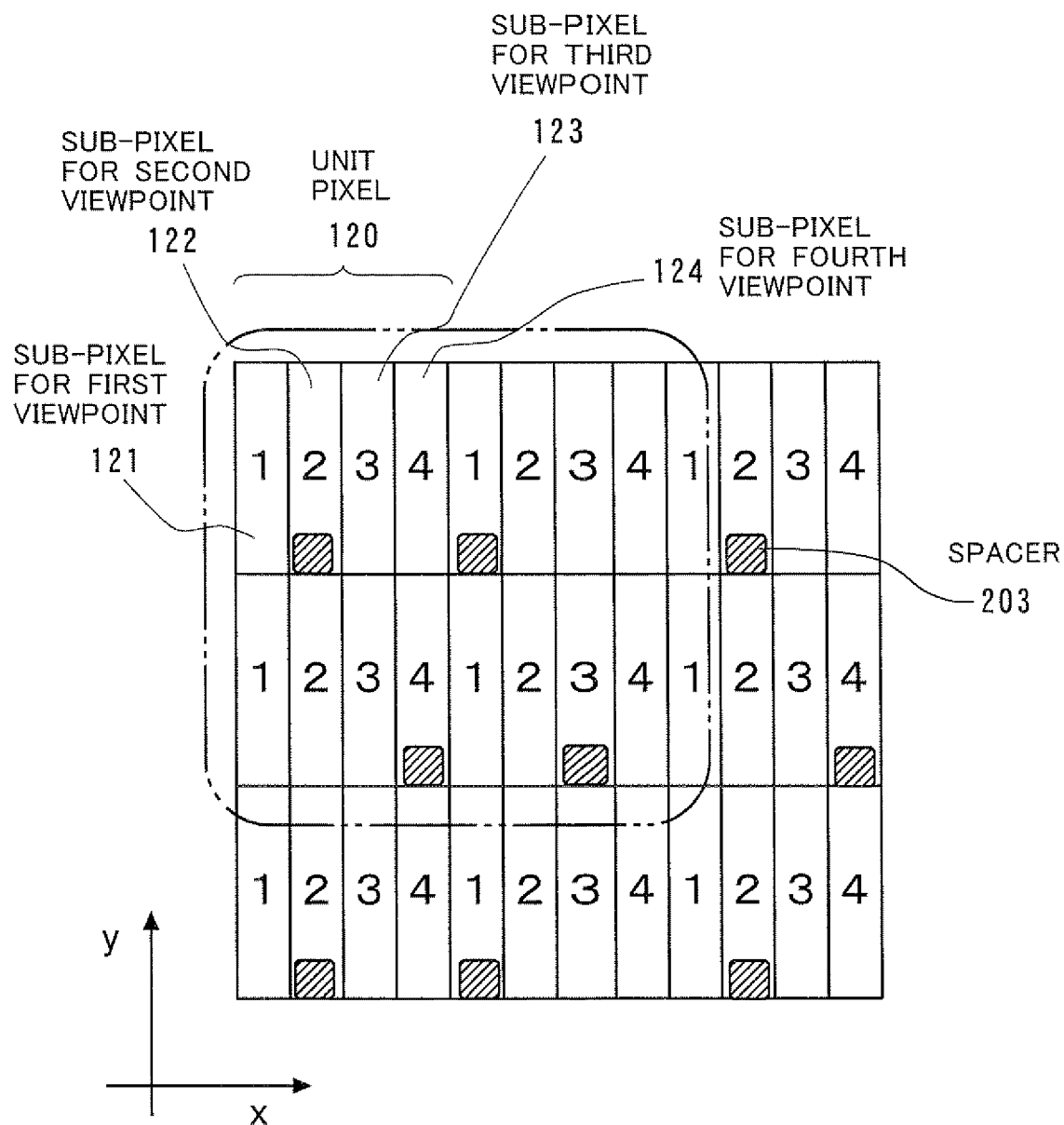

DISPLAY DEVICE AND TERMINAL UNIT USING THE SAME

BACKGROUND OF THE INVENTION

1. Field of the Invention

The present invention relates to a display device and a terminal unit using the same and more particularly, to a display device capable of displaying different images for a plurality of viewpoints and a terminal unit using the display device.

2. Description of the Related Art

In recent years, mounting Liquid Crystal Display (LCD) devices on small-sized electronic equipment such as projectors and portable telephones has been increasing rapidly to exploit the features of the LCD devices, i.e., low power consumption, reduced weight, and low profile. On the other hand, value-added products to be fabricated by adding some function or performance to the LCD device have also been developed, an example of which is the three-dimensional LCD device capable of displaying three-dimensional images using an optical element that separates images for different viewpoints (i.e., an optical image separation element). With the three-dimensional LCD devices of this type, a viewer can recognize three-dimensional images with the naked eyes without using any dedicated eyeglasses. It is typical that a lens (e.g., a lenticular lens, a fly's-eye lens, or the like) or a parallax barrier is used as the optical image separation element.

For example, an image display device comprising a display panel and a lenticular lens is disclosed in the Patent Document 1 (Japanese Unexamined Patent Publication No. 2004-280052) published in 2004 (see claim 1 and FIGS. 1 and 3). The display panel comprises display pixels arranged in a matrix array, where each of the display pixels is formed by (M×N) sub-pixels for N viewpoints (M and N are natural numbers). The lenticular lens divides the light beams at the respective sub-pixels among the N viewpoints. The (M×N) sub-pixels, which are included in each of the display pixels, are formed in a square region.

With the related-art image display device disclosed in the Patent Document 1, the (M×N) sub-pixels included in each of the display pixels are formed in the square region and therefore, images for the N viewpoints can be generated by these display pixels. If N is two or greater, images for the right eye and those for the left eye can be respectively supplied to the different viewpoints; thus, three-dimensional images can be displayed, where the shape of the display pixel is square. If the same images are displayed by the N sub-pixels, two-dimensional images can be displayed. The resolution of the images at the time two-dimensional images are displayed is equal to that at the time three-dimensional images are displayed. The shape of the display pixel is square at the time two-dimensional images are displayed is equal to that at the time three-dimensional images are displayed.

In this way, the resolution in the event of displaying three-dimensional images and that in the event of displaying two-dimensional images can be equalized to each other and at the same time, a feeling of wrongness does not seen even if three- and two-dimensional images are mixed, and three-dimensional images can be displayed at any positions on two-dimensional images. Moreover, since the shape of the display pixel can be made square, the visibility of images (in particular, characters) is superior (see paragraph 0023).

Another image display device comprising a display panel and a parallax barrier is also disclosed in the Patent Document 1 (see claim 12 and FIG. 21). The display panel comprises display pixels arranged in a matrix array, where each of the display pixels is formed by (M×N) sub-pixels for N viewpoints (M and N are natural numbers). The parallax barrier divides the light beams at the respective sub-pixels among the N viewpoints. The (M×N) sub-pixels, which are included in each of the display pixels, are formed in a square region. This image display device is the same in structure as the above-described related-art image display device except that the parallax barrier is used instead of the lenticular lens. The action and advantages of this image display device are the same as those of the above-described image display device (see paragraphs 0041 and 0042).

A three-dimensional LCD device is disclosed in the Patent Document 2 (Japanese Unexamined Patent Publication No. 7-5417) published in 1995 (see claim 1 and FIGS. 1 to 3). This LCD device displays three-dimensional images using a LCD panel that comprises transparent electrodes formed on the inner surfaces of two substrates in such a way as to be opposite to each other. During the operation, signal voltages are applied across the liquid crystal material confined in the gap between the two substrates of the LCD panel, thereby displaying images. A lenticular lens, which is formed by continuously arranging semi-cylindrical convex lenses along the lateral direction of the LCD panel, is located on the front surface of the display section of the LCD panel. Pairs of stripe-shaped image display regions for the right eye and those for the left eye are formed to extend along the vertical direction of the LCD panel corresponding to the respective convex lenses of the lenticular lens. Stripe-shaped spacers are formed at the respective sections that define the image display regions for the right and left eyes between the upper and lower substrates of the LCD panel.

With the related-art three-dimensional LCD device disclosed in the Patent Document 2, because the pairs of stripe-shaped image display regions for the right eye and those for the left eye are formed corresponding to the respective convex lenses of the lenticular lens, proper three-dimensional images can be displayed. Moreover, because the stripe-shaped spacers are formed at the respective sections that define the image display regions for the right and left eyes between the upper and lower substrates of the LCD panel, the effects applied to the displayed images are made less. At the same time, if the liquid crystal material is injected into the gap between the upper and lower substrates along the longitudinal direction of the stripe-shaped spacers, uneven distribution and move of the spacers do not occur during the injection operation of the liquid crystal material. As a result, a uniform gap between the upper and lower substrates is maintained at all times and proper images are displayed (see paragraphs 0018 and 0030).

Another three-dimensional LCD device is disclosed in the Patent Document 2 (see claim 3 and FIG. 4). Similar to the above-described related-art three-dimensional LCD device of the Patent Document 2, this LCD device displays three-dimensional images using a LCD panel that comprises transparent electrodes formed on the inner surfaces of two substrates in such a way as to be opposite to each other. During the operation, signal voltages are applied across the liquid crystal material confined in the gap between the two substrates of the LCD panel, thereby displaying images. A lenticular lens, which is formed by continuously arranging semi-cylindrical convex lenses along the lateral direction of the LCD panel, is located on the front surface of the display section of the LCD panel. Pairs of stripe-shaped image display regions for the right eye and those for the left eye are formed to extend along the vertical direction of the LCD panel corresponding to the respective convex lenses of the lenticular lens. Stripe-shaped spacers are formed at the respective boundaries where the convex lenses of the lenticular lens are adjacent to each other between the upper and lower substrates of the LCD panel. This LCD device is the same in structure as the above-described LCD device except that the stripe-shaped spacers are formed at the respective boundaries of the convex lenses, not at the respective sections that define the image display regions for the right and left eyes. The action and advantages of this LCD device are the same as those of the above-described related-art LCD device (see paragraphs 0020 and 0038 to 0039).

By the way, with an image display device of the type capable of displaying simultaneously two-dimensional images and three-dimensional images, examples of which are disclosed in the Patent Document 1, to display images for two viewpoints (i.e., N=2), two sub-pixels (i.e., one sub-pixel for the left eye and one sub-pixel for the right eye) are combined together to form a unit pixel. When two different images are generated by using the sub-pixels for the left eye and the sub-pixels for the right eye in consideration of parallax, a three-dimensional image is displayed. When the two same images are generated by using the sub-pixels for the left eye and the sub-pixels for the right eye, a two-dimensional image is displayed. In addition, to display images for three or more viewpoints (i.e., N>3), three or more sub-pixels, the number of which is equal to the number of viewpoints (=N), are combined to form a unit pixel.

When a LCD panel is used as the display panel in the above-described related-art image display devices disclosed in the Patent Document 1, it is required for the LCD panel to have a higher definition than that of an LCD panel designed for ordinary LCD devices incapable of displaying different images for a plurality of viewpoints. This is because if we seek to display images using the same pixel number as that of an LCD panel designed for ordinary LCD devices, the necessary pixel number for the LCD panel will be equal to a multiple (=N) of the viewpoint number. In this way, to conduct sufficient image separation in a high-definition LCD panel, the distance between the pixels formed in the LCD panel and the optical image separation element placed on the front surface (i.e., the surface at the viewer's side) of the LCD panel needs to be reduced as much as possible. For this reason, it is necessary to thin the substrate of the LCD panel placed at the viewer's side.

On the other hand, it is usual for a LCD device to have a small gap between a pair of substrates (i.e., a main substrate and an opposite substrate) to form a space in which a liquid crystal material is confined. To make the gap uniform over the whole surfaces of the pair of substrates, spacers having a predetermined rigidity are arranged between the pair of substrates. It is often that granular or columnar spacers are used for this purpose. For example, many grains are dispersed randomly between the pair of substrates, where the gains are called the "granular spacers". Alternately, a photosensitive resin may be coated on one of the pair of substrates at the predetermined positions and be exposed and developed by photolithography, thereby forming patterned spacers. These patterned spacers are called the "photolithographic or columnar spacers". (The reason why the latter spacers are called the "columnar spacers" is that these spacers are arranged at the predetermined positions between the pair of substrates in such a way as to extend across the pair of substrates in the form of column or pillar that support the same.

The granular spacers are dispersed randomly between the pair of substrates and therefore, they may be placed on the pixels. In this case, a disadvantage of large contrast lowering arises because some unevenness of alignment of the liquid crystal molecules occurs in the vicinities of the granular spacers placed on the pixels. Moreover, when the viewer's side substrate of the LCD panel is thinned, there arises another disadvantage that the gap unevenness between the pair of substrates is likely to occur due to the distribution non-uniformity (i.e., randomness) of the granular spacers, and that this gap unevenness is likely to become large gradually due to the rigidity lowering of the substrates and/or the distortion release thereof. Accordingly, it is preferred that the columnar spacers are used for high definition LCD devices.

Furthermore, when the viewer's side substrate of the LCD panel is thinned, a polishing process may be used. Since the granular spacers may be moved within the substrate gap in the polishing process of the viewer's side substrate, there is a possibility that the granular spacers gathered at specific positions are recognized as display unevenness. Accordingly, when a polishing process is used for this purpose, it is essential to use the spacers that will be fixed at the predetermined positions like the columnar spacers.

Because of the above-described reasons, it has been common to use the columnar spacers for high-definition LCD panels.

However, even with a high-definition LCD panel using the columnar spacers, there is a possibility that the regions of the alignment film hidden behind the columnar spacers are not sufficiently rubbed due to the pressing force insufficiency of the rubbing material in the rubbing process of the alignment film for giving the initial alignment to the liquid crystal molecules. This causes a problem that the alignment of the liquid crystal molecules is defective in the regions hidden behind the columnar spacers. Moreover, since the alignment direction of the liquid crystal molecules is distorted near the columnar spacers, a problem that the alignment of the liquid crystal molecules is defective may be arisen even if the rubbing process is not carried out. The defective alignment regions of the liquid crystal molecule, which are formed by the columnar spacers in this way, will give rise to disadvantages (e.g., optical leakage), and as a result, these defective alignment regions will be a cause for various image quality degradations including contrast lowering. To prevent such the image quality degradations, it is sufficient that the defective alignment regions are optically shielded. However, if so, the aperture ratio is lowered significantly. This means that the optical shield of the defective alignment regions is not preferred.

In particular, with a high-definition LCD panel designed for a three-dimensional image display device, the pixels are miniaturized; on the other hand, the columnar spacers need to have such a size as to maintain the substrate gap, in other words, the columnar spacer is unable to be miniaturized on approximately the same level as the pixel. Therefore, the occupation ratio of the columnar spacer in each pixel for a high-definition LCD panel is greater than that for an ordinary (i.e., non-high-definition) LCD panel. As a result, the aperture ratio lowering will appear conspicuously, which means that the necessity for preventing the aperture ratio lowering is very high in a high-definition LCD panel. Accordingly, it is necessary to suppress the image quality degradations caused by the defective alignment regions of the liquid crystal molecule without optically shielding the said defective alignment regions (i.e., without lowering the aperture ratio).

In addition, to maintain the substrate gap uniformly over the whole LCD panel, the columnar spacers are arranged periodically at or in the specific or particular positions in the respective pixels where their heights are the same. Therefore, the aforementioned defective alignment regions caused by the columnar spacers will be formed periodically at or in the specific or particular positions in the respective pixels. For this reason, with a display device capable of displaying different images for a plurality of viewpoints, like a three-dimensional LCD device configured by combining a high-definition LCD panel including the aforementioned columnar spacers with an optical image separation element, there is a disadvantage that the image quality degradations (e.g., optical leakage) due to the aforementioned defective alignment regions will be recognized only at the specific observation positions (in other words, the said image quality degradations will change dependent on the observation positions). Furthermore, since the images for the respective viewpoints are enlarged and displayed, the aforementioned defective alignment regions are likely to be recognized by the viewer.

In particular, when the columnar spacers are arranged at either the sub-pixels for the left eyes or those for the right eyes, the effects of the aforementioned defective alignment regions will appear in the displayed images for the left eyes or those for the right eyes only. Therefore, the image quality difference between the displayed images for the left eyes and those for the right eyes will be conspicuous and very easy to be recognized. Accordingly, it is also necessary to suppress the image quality degradations caused by the periodicity in placement of the aforementioned defective alignment regions.

Because of the above-described reasons, it is strongly desirable for the high-definition LCD panel including the columnar spacers to suppress the effects of the aforementioned defective alignment regions caused by the columnar spacers without lowering the aperture ratio as much as possible.

Each of the related-art three-dimensional LCD devices disclosed in the aforementioned Patent Document 2 comprises the spacers provided between the pair of substrates of the LCD panel, where these spacers correspond to the above-described columnar spacers. These columnar spacers are placed at the respective sections that define the image display regions for the right eyes (which correspond to the sub-pixels for the right eyes) and the image display regions for the left eyes (which correspond to the sub-pixels for the left eyes), or at the respective boundaries where the convex lenses (each of which is equal in width to the unit pixel formed by the combination of the sub-pixel for the left eye and the sub-pixel for the right eye) of the lenticular lens are adjacent to each other. These columnar spacers are stripe-shaped in such a way as to be extended along the sections that define the sub-pixels for the right eyes and those for the left eyes, or along the boundaries where the convex lenses are adjacent to each other.

When the columnar spacers, which are stripe-shaped, are arranged in such a way as to be extended along the sections that define the sub-pixels for the right eye and those for the left eye in a high-definition LCD panel like the columnar spacers of one of the three-dimensional LCD devices disclosed in the aforementioned Patent Document 2, the non-light-transmission portions will be large. This is because the width of the columnar spacers is larger than that of the black matrix defining the sub-pixels for the left eyes and those for the right eyes. Accordingly, the angle where two-dimensional images become unable to be recognized will be large. As a result, there arises a problem that non-light-transmission regions (through which the light does not penetrate due to the existence of the columnar spacers) are generated at the front of the three-dimensional LCD device. This point will be explained concretely with reference to FIG. 1.

In FIG. 1, each of the unit pixels 10 arranged in a matrix array in the LCD panel (not shown) is formed by two sub-pixels adjacent to each other, i.e., a sub-pixel 7 for the right eye and a sub-pixel 6 for the left eye. These unit pixels 10 are arranged close to a lenticular lens 21. The lenticular lens 21 is configured by aligning a plurality of lens elements 21a, each of which is formed by a convex cylindrical lens. Columnar spacers 13, which are extended in the form of stripes perpendicular to the paper face of FIG. 1, are arranged in the respective sections that define the sub-pixels 7 for the right eye and the sub-pixels 6 for the left eye. As shown in FIG. 1, the columnar spacers 13 are larger in width than the sub-pixels 6 and 7 and therefore, the portions through which the light emitted from the light source does not penetrate (i.e., the non-light-transmission portions) will be considerably large according to the width difference between the columnar spacers 13 and the sub-pixels 6 and 7. As a result, the non-light-transmission regions are generated at the front of the three-dimensional LCD device, which causes a problem that the regions where images are not seen are formed.

In the case where the aforementioned stripe-shaped spacers 13 are arranged along the boundaries where the convex lenses 21a (i.e., the unit pixels 10) of the lenticular lens 21 are adjacent to each other, like the other of the related-art three-dimensional LCD devices disclosed in the aforementioned Patent Document 2, if some difference occurs between the pitch of the convex lenses 21a (i.e., the unit pixels 10) and that of the sub-pixels 6 and 7, the boundary lines of the unit pixels 10 and those of the sub-pixels 6 and 7 will deviate from each other in the end portion of the LCD panel. For this reason, as shown in FIG. 2, the columnar spacers 13, which should be placed at the respective boundaries of the sub-pixels 6 and 7, will be placed in such a way as to be overlapped with the sub-pixels 6 or 7 contrary to expectations. As a result, there arises a problem that the non-displayable regions where desired images are unable to be displayed may be formed.

As seen from the aforementioned explanation, problems will arise even if the stripe-shaped columnar spacers 13 are placed in any one of the two forms of the related-art three-dimensional LCD devices disclosed in the aforementioned Patent Document 2 to make a high-definition LCD panel.

SUMMARY OF THE INVENTION

The present invention was created in consideration of the above-described problems.

A chief object of the present invention is to provide a display device that reduces the image quality degradations by suppressing the effect of the defective alignment regions caused by the spacers while minimizing the aperture ratio lowering, that prevents the image quality change dependent on the observation positions, and that avoids the problems arisen from the placement of the spacers in the two forms of the related-art three-dimensional LCD devices disclosed in the aforementioned Patent Document 2, and a terminal unit using the display device.

The above object together with others not specifically mentioned will become clear to those skilled in the art from the following description and the figures attached.

According to the first aspect of the present invention, a display device is provided, which comprises:

a display panel having unit pixels arranged in a matrix array, each of the unit pixels including at least a first sub-pixel for a first viewpoint and a second sub-pixel for a second viewpoint;

an optical image separation element for separating an incoming image generated by the first sub-pixel and the second sub-pixel into two outgoing images and for emitting respectively the outgoing images toward the first viewpoint and the second viewpoint; and the display panel comprising a pair of substrates coupled to each other to have a predetermined gap, and spacers arranged at predetermined positions in the gap, wherein the spacers keeps the pair of substrates at the predetermined gap;

wherein the spacers are stripe-shaped in such a way as to be extended along a direction perpendicular to an image separation axis of the optical image separation element; and the spacers are equally overlapped with (or overlaid on) the first sub-pixel and the second sub-pixel of each of the unit pixels.

With the display device according to the first aspect of the present invention, each of the unit pixels of the display panel includes at least the first sub-pixel for the first viewpoint and the second sub-pixel for the second viewpoint. The spacers arranged at the predetermined positions in the gap of the display panel are stripe-shaped in such a way as to be extended along the direction perpendicular to the image separation axis of the optical image separation element. The spacers are equally overlapped with (or overlaid on) the first sub-pixel and the second sub-pixel of each of the unit pixels. Therefore, the defective alignment regions induced by the spacers will exist equally in the first and second sub-pixels. As a result, the display quality can be prevented from changing dependent on the observation position.

Moreover, because the display quality can be prevented from changing dependent on the observation position as described above, the effect of the defective alignment regions can be suppressed, even if all the defective alignment regions are not optically shielded. This means that it is sufficient for this purpose to optically shield the defective alignment regions partially. Accordingly, the effect of the defective alignment regions can be suppressed while minimizing the aperture ratio lowering, which makes it possible to reduce the image quality degradations.

Furthermore, the spacers are stripe-shaped in such a way as to be extended along the direction perpendicular to the image separation axis of the optical image separation element, and are equally overlapped with or overlaid on the sub-pixels for the first viewpoint and the sub-pixels for the second viewpoint. Therefore, the non-light-transmission portions generated in the unit pixels will not be so large. This means that there is no possibility that the non-light-transmission regions are generated at the front of the display device according to the first aspect of the invention.

In addition, even if some difference occurs between the pitch of the unit pixels and that of the sub-pixels for the first and second viewpoints, the non-displayable regions where desired images are unable to be displayed due to overlapping the spacers with the sub-pixels for the first or second viewpoints are not formed.

Accordingly, the problems arisen from the placement of the spacers in the two forms of the related-art three-dimensional LCD devices disclosed in the aforementioned Patent Document 2 can be avoided.

In a preferred embodiment of the display device according to the first aspect of the invention, the spacers are continuously extended over the unit pixels adjacent to each other.

In another preferred embodiment of the display device according to the first aspect of the invention, the spacers are isolated for the respective unit pixels, the respective first sub-pixels, or the respective second sub-pixels. In this embodiment, there is an additional advantage that the aperture ratio lowering can be suppressed furthermore compared with the case where the spacers are continuously extended over the adjacent unit pixels.

According to the second aspect of the present invention, another display device is provided, which is different from the display device according to the first aspect of the invention in that the spacers are isolated and assigned to the respective unit pixels, the respective first sub-pixels for the first viewpoint, or the respective second sub-pixels for the second viewpoint, and that the isolated spacers are arranged along a direction perpendicular to an image separation axis of the optical image separation element.

Specifically, the display device according to the second aspect of the invention comprises:

a display panel having unit pixels arranged in a matrix array, each of the unit pixels including at least a first sub-pixel for a first viewpoint and a second sub-pixel for a second viewpoint;

an optical image separation element for separating an incoming image generated by the first sub-pixel and the second sub-pixel into two outgoing images and for emitting respectively the outgoing images toward the first viewpoint and the second viewpoint; and the display panel comprising a pair of substrates coupled to each other to have a predetermined gap, and spacers arranged at predetermined positions in the gap, wherein the spacers keeps the pair of substrates at the predetermined gap;

wherein the spacers are isolated for each of the pixel units, the first sub-pixels for the first viewpoint, or the second sub-pixels for the second viewpoint, and are arranged along a direction perpendicular to an image separation axis of the optical image separation element; and the isolated spacers assigned to the first sub-pixel and the second sub-pixel that constitute each of the unit pixels are symmetrically arranged with respect to a boundary between the said first sub-pixel and the said second sub-pixel.

With the display device according to the second aspect of the present invention, each of the unit pixels of the display panel includes at least the first sub-pixel for the first viewpoint and the second sub-pixel for the second viewpoint. The spacers arranged at the predetermined positions in the gap of the display panel are isolated for each of the pixel units, the first sub-pixels for the first viewpoint, or the second sub-pixels for the second viewpoint, and are arranged along the direction perpendicular to the image separation axis of the optical image separation element. The isolated spacers assigned to the first sub-pixel and the second sub-pixel that constitute each of the unit pixels are symmetrically arranged with respect to the boundary between the said first sub-pixel and the said second sub-pixel. Therefore, the defective alignment regions induced by the spacers will exist equally in the sub-pixel for the first viewpoint and the sub-pixel for the second viewpoint that constitute each of the unit pixels. As a result, the display quality can be prevented from changing dependent on the observation position.

Moreover, because the display quality can be prevented from changing dependent on the observation position as described above, the effect of the defective alignment regions can be suppressed, even if all the defective alignment regions are not optically shielded. This means that it is sufficient for this purpose to optically shield the defective alignment regions partially. Accordingly, the effect of the defective alignment regions can be suppressed while minimizing the aperture ratio lowering, which makes it possible to reduce the image quality degradations.

Furthermore, the spacers are isolated for each of the pixel units, the first sub-pixels for the first viewpoint, or the second sub-pixels for the second viewpoint. The isolated spacers assigned to the first sub-pixel and the second sub-pixel that constitute each of the unit pixels are symmetrically arranged with respect to the boundary between the said first sub-pixel and the said second sub-pixel. Therefore, the non-light-transmission portions generated in the unit pixels will not be so large. This means that there is no possibility that the nonlight-transmission regions are generated at the front of the display device according to the second aspect of the invention.

In addition, even if some difference occurs between the pitch of the unit pixels and that of the first and second sub-pixels, the non-displayable regions where desired images are unable to be displayed due to overlapping the spacers with the first or second sub-pixels are not formed.

Accordingly, the problems arisen from the placement of the spacers in the two forms of the related-art three-dimensional LCD devices disclosed in the aforementioned Patent Document 2 can be avoided.

In a preferred embodiment of the display device according to the second aspect of the invention, one of the spacers is placed in the first sub-pixel of the unit pixel and another of the spacers is placed in the second sub-pixel thereof.

In another preferred embodiment of the display device according to the second aspect of the invention, two or more of the spacers are placed in the first sub-pixel of the unit pixel and other two or more of the spacers are placed in the second sub-pixel thereof.

In still another preferred embodiment of the display device according to the second aspect of the invention, two or more of the spacers are placed in the first sub-pixel of the unit pixel, and other two or more of the spacers are placed in the second sub-pixel of the unit pixel, wherein the spacers placed in each of the first and second sub-pixels are shifted to each other along the direction perpendicular to the image separation axis of the optical image separation element. In this embodiment, there is an advantage that it is easy to cope with the restriction as to the positions of the spacers to be placed.

According to the third aspect of the present invention, still another display device is provided, which is different from the display devices according to the first and second aspects of the invention in that the unit pixels are separated into a first group including the spacers and a second group including no spacer.

Specifically, the display device according to the third aspect of the invention comprises:

a display panel having unit pixels arranged in a matrix array, each of the unit pixels including at least a first sub-pixel for a first viewpoint and a second sub-pixel for a second viewpoint;

an optical image separation element for separating an incoming image generated by the first sub-pixel and the second sub-pixel into two outgoing images and for emitting respectively the outgoing images toward the first viewpoint and the second viewpoint; and the display panel comprising a pair of substrates coupled to each other to have a predetermined gap, and spacers arranged at predetermined positions in the gap, wherein the spacers keeps the pair of substrates at the predetermined gap;

wherein the unit pixels are separated into a first group including the spacers and a second group including no spacer;

the spacers placed in the unit pixels of the first group are isolated for each of the pixel units, the first sub-pixels for the first viewpoint, or the second sub-pixels for the second viewpoint, and are arranged along a direction perpendicular to an image separation axis of the optical image separation element; and the unit pixels of the first group and the unit pixels of the second group adjacent to each other are arranged in such a way as to compensate an effect of defective alignment regions induced by the spacers.

With the display device according to the third aspect of the present invention, the unit pixels of the display panel are separated into the first group including the spacers and the second group including no spacer, and each of the unit pixels includes at least the first sub-pixel for the first viewpoint and the second sub-pixel for the second viewpoint. The spacers arranged at the predetermined positions in the gap of the display panel are isolated for each of the pixel units, the first sub-pixels for the first viewpoint, or the second sub-pixels for the second viewpoint, and are arranged along the direction perpendicular to the image separation axis of the optical image separation element. The unit pixels of the first group and the unit pixels of the second group adjacent to each other are arranged in such a way as to compensate the effect of defective alignment regions induced by the spacers. As a result, the display quality can be prevented from changing dependent on the observation position.

Moreover, because the display quality can be prevented from changing dependent on the observation position as described above, the effect of the defective alignment regions can be suppressed, even if all the defective alignment regions are not optically shielded. This means that it is sufficient for this purpose to optically shield the defective alignment regions partially. Accordingly, the effect of the defective alignment regions can be suppressed while minimizing the aperture ratio lowering, which makes it possible to reduce the image quality degradations.

Furthermore, the spacers placed in the unit pixels of the first group are isolated for each of the pixel units, the first sub-pixels for the first viewpoint, or the second sub-pixels for the second viewpoint, and are arranged along the direction perpendicular to the image separation axis of the optical image separation element. The unit pixels of the first group and the unit pixels of the second group adjacent to each other are arranged in such a way as to compensate the effect of defective alignment regions induced by the spacers. Therefore, the non-light-transmission portions generated in the unit pixels of the first group will not be so large. This means that there is no possibility that the non-light-transmission regions are generated at the front of the display device according to the third aspect of the invention.

In addition, even if some difference occurs between the pitch of the unit pixels and that of the first and second sub-pixels, the non-displayable regions where desired images are unable to be displayed due to overlapping the spacers with the first or second sub-pixels are not formed.

Accordingly, the problems arisen from the placement of the spacers in the two forms of the related-art three-dimensional LCD devices disclosed in the aforementioned Patent Document 2 can be avoided.

In a preferred embodiment of the display device according to the third aspect of the invention, the unit pixels of the first group are arranged along part of the columns of the matrix, and the unit pixels of the second group are arranged along the remainder of the columns of the matrix, wherein the unit pixels of the first group and the unit pixels of the second group are alternately arranged along the rows of the matrix.

In another preferred embodiment of the display device according to the third aspect of the invention, the unit pixels of the first group are arranged along part of the rows of the matrix, and the unit pixels of the second group are arranged along the remainder of the rows of the matrix, wherein the unit pixels of the first group and the unit pixels of the second group are alternately arranged along the columns of the matrix.

In still another preferred embodiment of the display device according to the third aspect of the invention, the unit pixels of the first group and the unit pixels of the second group are alternately arranged along the rows and columns of the matrix in such a way as to form a checkered pattern.

In a further preferred embodiment of the display device according to the third aspect of the invention, one of the spacers is placed in each of the unit pixels of the first group.

In a still further preferred embodiment of the display device according to the third aspect of the invention, two or more of the spacers are placed in each of the unit pixels of the first group.

In a still further preferred embodiment of the display device according to the third aspect of the invention, two or more of the spacers are placed in each of the unit pixels of the first group, wherein the spacers are shifted to each other along the direction perpendicular to the image separation axis of the optical image separation element in each of the unit pixels. In this embodiment, there is an advantage that it is easy to cope with the restriction as to the positions of the spacers to be placed.

According to the fourth aspect of the present invention, a further display device is provided, which is different from the display device according to the third aspect of the invention in that the unit pixels are separated into a first group including the spacers placed in first sub-pixels for a first viewpoint and a second group including the spacers placed in second sub-pixels for a second viewpoint.

Specifically, the display device according to the fourth aspect of the invention comprises:

a display panel having unit pixels arranged in a matrix array, each of the unit pixels including at least a first sub-pixel for a first viewpoint and a second sub-pixel for a second viewpoint;

an optical image separation element for separating an incoming image generated by the first sub-pixel and the second sub-pixel into two outgoing images and for emitting respectively the outgoing images toward the first viewpoint and the second viewpoint; and the display panel comprising a pair of substrates coupled to each other to have a predetermined gap, and spacers arranged at predetermined positions in the gap, wherein the spacers keeps the pair of substrates at the predetermined gap;

wherein the unit pixels are separated into a first group including the spacers placed in the first sub-pixels and a second group including the spacers placed in the second sub-pixels;

the spacers placed in the unit pixels of the first group are isolated for each of the first sub-pixels, and are arranged along a direction perpendicular to an image separation axis of the optical image separation element;

the spacers placed in the unit pixels of the second group are isolated for each of the second sub-pixels, and are arranged along the direction perpendicular to the image separation axis of the optical image separation element; and the unit pixels of the first group and the unit pixels of the second group adjacent to each other are arranged in such a way as to compensate an effect of defective alignment regions induced by the spacers.

With the display device according to the fourth aspect of the present invention, the unit pixels of the display panel are separated into the first group including the spacers in the first sub-pixels for the first viewpoint and the second group including the spacers in the second sub-pixels for the second viewpoint, and each of the unit pixels includes at least the first sub-pixel for the first viewpoint and the second sub-pixel for the second viewpoint. The spacers arranged in the first group are isolated for each of the first sub-pixels, and are arranged along the direction perpendicular to the image separation axis of the optical image separation element. The spacers arranged in the second group are isolated for each of the second sub-pixels, and are arranged along the direction perpendicular to the image separation axis of the optical image separation element. The unit pixels of the first group and the unit pixels of the second group adjacent to each other are arranged in such a way as to compensate the effect of defective alignment regions induced by the spacers. As a result, the display quality can be prevented from changing dependent on the observation position.

Moreover, because the display quality can be prevented from changing dependent on the observation position as described above, the effect of the defective alignment regions can be suppressed, even if all the defective alignment regions are not optically shielded. This means that it is sufficient for this purpose to optically shield the defective alignment regions partially. Accordingly, the effect of the defective alignment regions can be suppressed while minimizing the aperture ratio lowering, which makes it possible to reduce the image quality degradations.

Furthermore, the spacers arranged in the first group are isolated for each of the first sub-pixels, and are arranged along the direction perpendicular to the image separation axis of the optical image separation element. The spacers arranged in the second group are isolated for each of the second sub-pixels, and are arranged along the direction perpendicular to the image separation axis of the optical image separation element. The unit pixels of the first group and the unit pixels of the second group adjacent to each other are arranged in such a way as to compensate the effect of defective alignment regions induced by the spacers. Therefore, the non-light-transmission portions generated in the unit pixels will not be so large. This means that there is no possibility that the non-light-transmission regions are generated at the front of the display device according to the fourth aspect of the invention.

In addition, even if some difference occurs between the pitch of the unit pixels and that of the first and second sub-pixels, the non-displayable regions where desired images are unable to be displayed due to overlapping the spacers with the first or second sub-pixels are not formed.

Accordingly, the problems arisen from the placement of the spacers in the two forms of the related-art three-dimensional LCD devices disclosed in the aforementioned Patent Document 2 can be avoided.

In a preferred embodiment of the display device according to the fourth aspect of the invention, the unit pixels of the first group are arranged along part of the columns of the matrix, and the unit pixels of the second group are arranged along the remainder of the columns of the matrix, wherein the unit pixels of the first group and the unit pixels of the second group are alternately arranged along the rows of the matrix.

In another preferred embodiment of the display device according to the fourth aspect of the invention, the unit pixels of the first group are arranged along part of the rows of the matrix, and the unit pixels of the second group are arranged along the remainder of the rows of the matrix, wherein the unit pixels of the first group and the unit pixels of the second group are alternately arranged along the columns of the matrix.

In still another preferred embodiment of the display device according to the fourth aspect of the invention, the unit pixels of the first group and the unit pixels of the second group are alternately arranged along the rows and columns of the matrix in such a way as to form a checkered pattern.

In a further preferred embodiment of the display device according to the fourth aspect of the invention, one of the spacers is placed in each of the unit pixels of the first group and the unit pixels of the second group.

In a still further preferred embodiment of the display device according to the fourth aspect of the invention, two or more of the spacers are placed in each of the unit pixels of the first group and the unit pixels of the second group.

In a still further preferred embodiment of the display device according to the fourth aspect of the invention, two or more of the spacers are placed in each of the unit pixels of the first group and the unit pixels of the second group, wherein the spacers are shifted to each other along the direction perpendicular to the image separation axis of the optical image separation element in each of the unit pixels. In this embodiment, there is an advantage that it is easy to cope with the restriction as to the positions of the spacers to be placed.

In a still further preferred embodiment of the display device according to the fourth aspect of the invention, when the optical image separation element is a lenticular lens constituted by connecting lens elements, a size of the defective alignment region is defined as A, an arrangement pitch and a focal length of the lens elements are respectively defined as L and f, and a distance between the lens element and the corresponding unit pixel is defined as H, the distance H is set to satisfy the following relationship.

$$f < L \times H / (L+A)$$

According to the fifth aspect of the present invention, a terminal unit is provided, which comprises one of the display devices according to the aforementioned first to fourth aspects of the invention.

With the terminal unit according to the fifth aspect of the invention, one of the display devices according to the aforementioned first to fourth aspects of the invention is included and therefore, it is apparent that the same advantages as those of the display device according to the one of the first to fourth aspects of the invention.

BRIEF DESCRIPTION OF THE DRAWINGS

In order that the present invention may be readily carried into effect, it will now be described with reference to the accompanying drawings.

FIG. 24 is an explanatory plan view showing a fourth variation of the pixel structure of the display panel used in the display device according to the sixth embodiment of the invention, where one isolated spacer is formed in one of the four sub-pixels for the first to fourth viewpoints while the three remaining sub-pixels include no spacer.

DETAILED DESCRIPTION OF THE PREFERRED EMBODIMENTS

Figure 1:
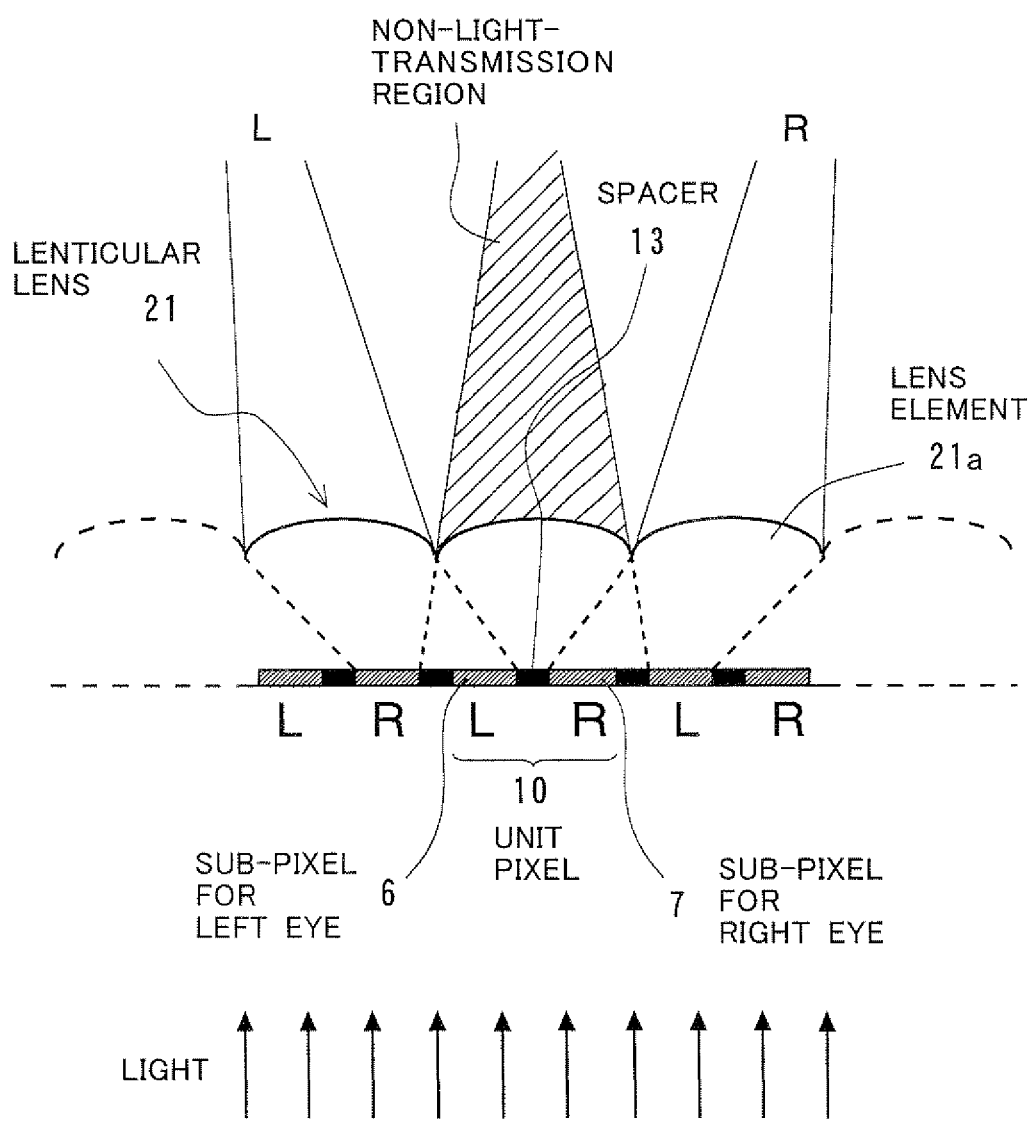
FIG. 1 is an explanatory view showing the optical paths in the case where a lenticular lens is bonded to a LCD panel using the columnar spacers disclosed in the Patent Document 2.
Figure 2:
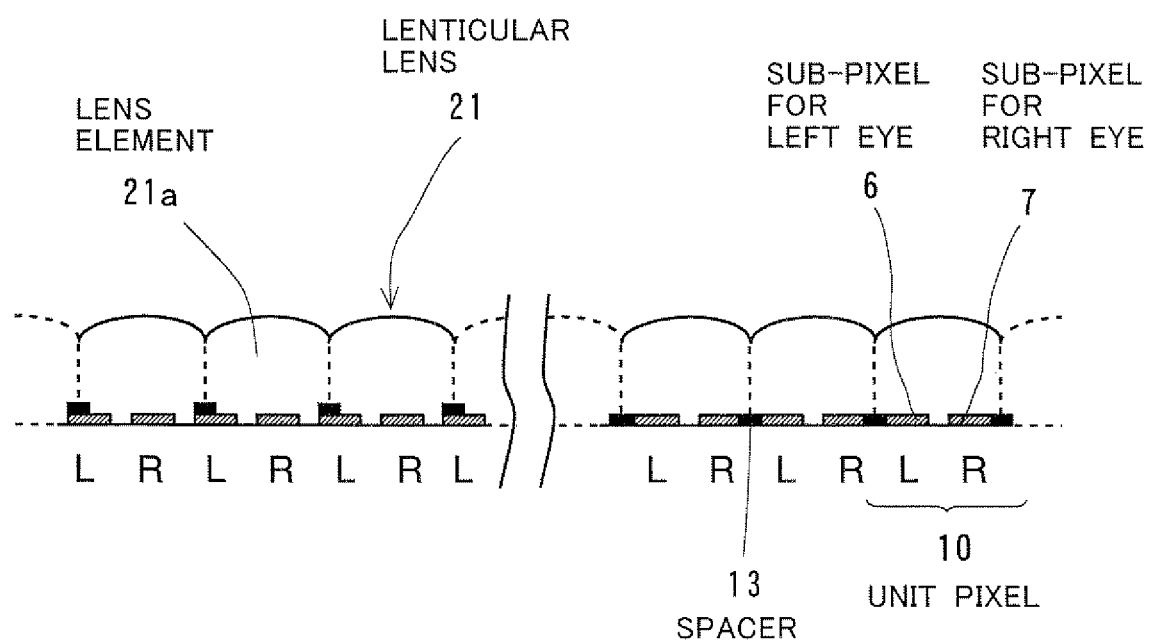
FIG. 2 is a schematic partial cross-sectional view showing the arrangement of the sub-pixels in the end portion of the LCD panel in the case where the lenticular lens is bonded to the LCD panel using the columnar spacers disclosed in the Patent Document 2.

Preferred embodiments of the present invention will be described in detail below while referring to the drawings attached.

First Embodiment

FIGS. 3 to 6 show a display device according to a first embodiment of the present invention.

Figure 6:
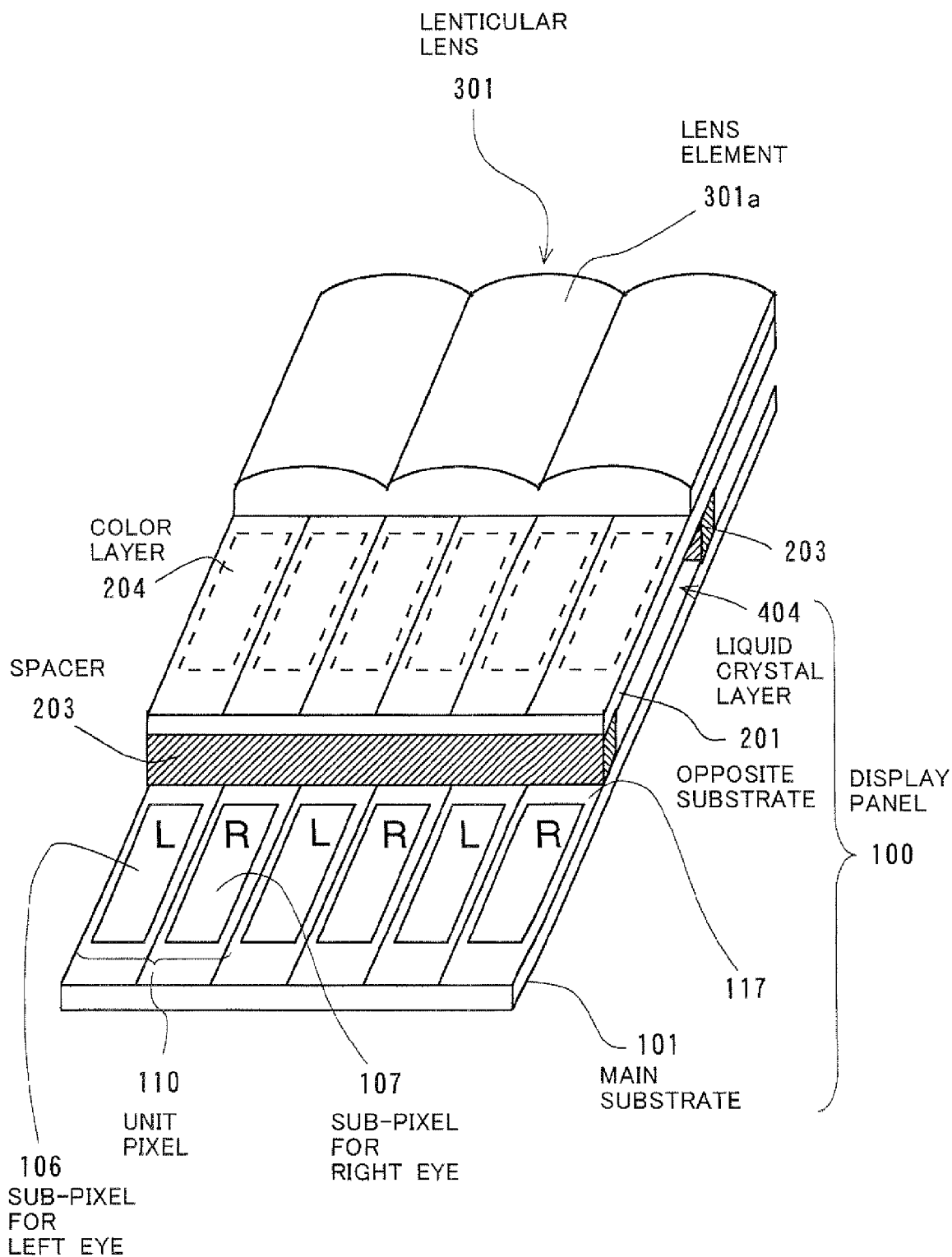
FIG. 6 is a partially cutaway partial perspective view showing the combined state of the display panel and the lenticular lens in the display device according to the first embodiment of the invention.

As shown in FIG. 6, the display device according to the first embodiment comprises a display panel 100 and a lenticular lens 301.

The display panel 100, which has a structure of LCD panel, comprises a main substrate 101, an opposite substrate 201 bonded and unified with the main substrate 101 in such a away as to have a predetermined gap therebetween, and a liquid crystal layer 404 injected into the gap between the substrates 101 and 201. The gap between the substrates 101 and 201 (which may be simply termed the "substrate gap") is kept approximately uniform over the whole surface of the panel 100 by spacers 203 arranged and fixed at predetermined positions between the substrate 101 and 201. Each of the spacers 203 is stripe-shaped.

Figure 4:
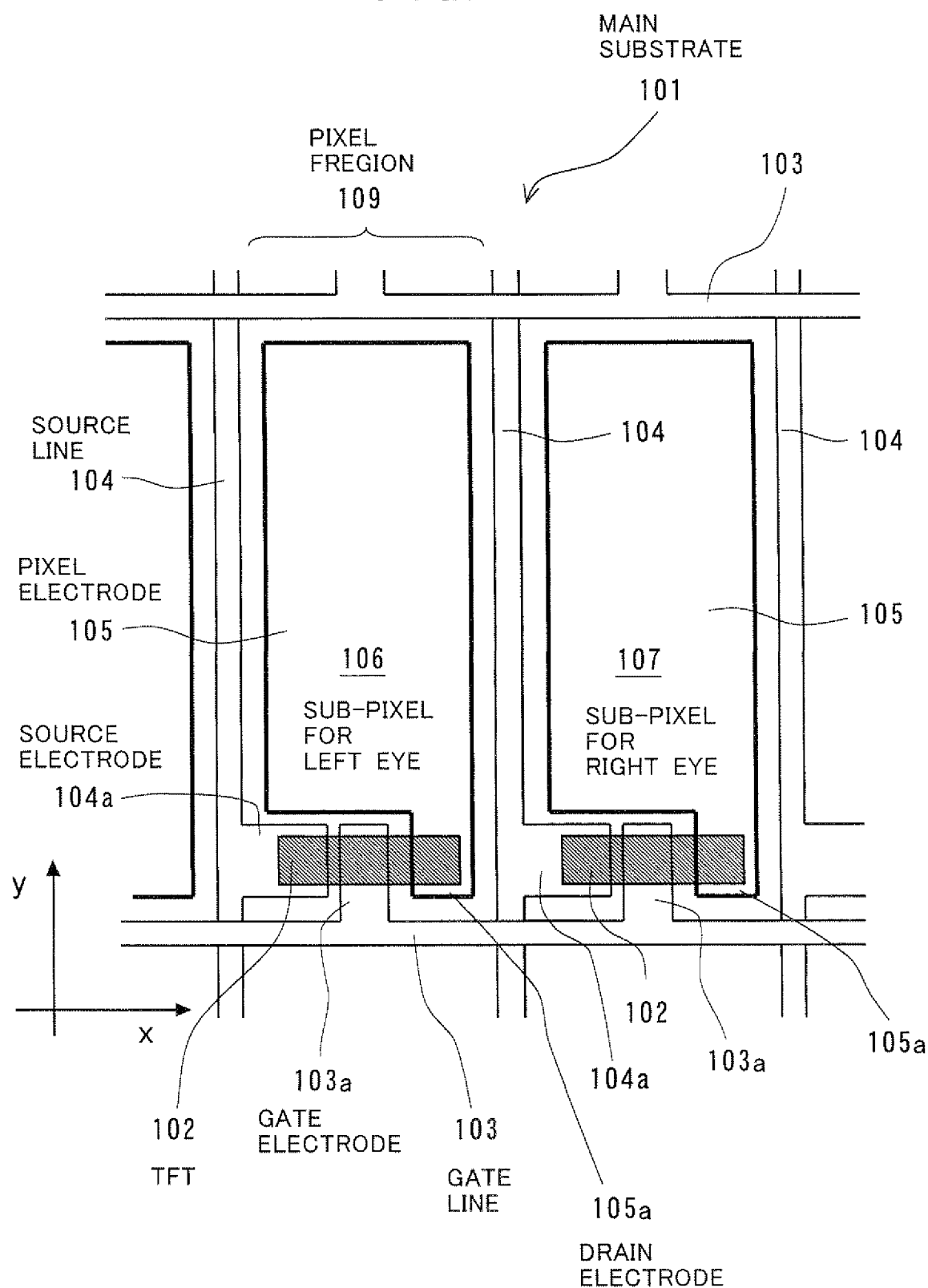
FIG. 4 is a partial plan view showing the structure of the main substrate of the display panel used in the display device according to the first embodiment of the invention.

As clearly shown in FIG. 4, the main substrate 101 comprises gate lines 103 extending along the horizontal direction of FIG. 4 (i.e., the x direction) and arranged at equal intervals along the vertical direction of FIG. 4 (i.e., the y direction), and source lines 104 extending along the vertical direction of FIG. 4 (i.e., the y direction) and arranged at equal intervals along the horizontal direction of FIG. 4 (i.e., the x direction). Light-shielding portions 117 are formed in the lattice-shaped regions defined by the gate lines 103 and the source lines 104 on the main substrate 101 (see FIG. 6). The light-shielding portions 117 define a plurality of approximately rectangular regions on the main substrate 101, each of which is a pixel region 109. These pixel regions 109 are arranged in a matrix array having the rows of a predetermined number and the columns of a predetermined number as a whole. These elements placed on the main substrate 101 are formed on or over a transparent glass plate (not shown).

In each of the pixel regions 109, a gate electrode 103a united with the corresponding gate line 103, a source electrode 104a united with the corresponding source line 104, a pixel electrode 105, and a drain electrode 105a united with the pixel electrode 105 are formed. The gate electrode 103a, the source electrode 104a, the drain electrode 105a, and a semiconductor film and a gate insulating film (both not shown) constitute a thin-film transistor (TFT) 102.

Figure 5:
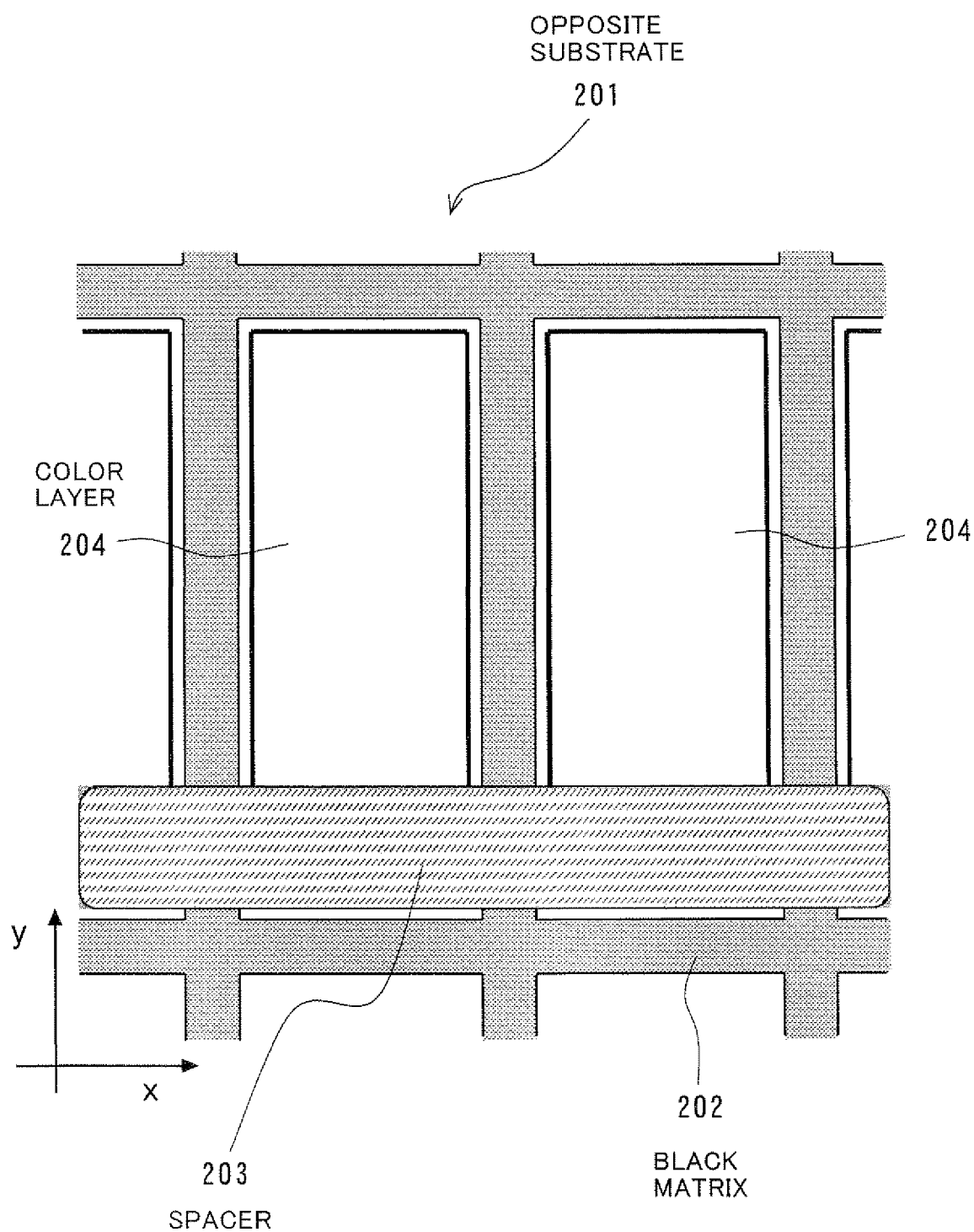
FIG. 5 is a partial plan view showing the structure of the opposite substrate of the display panel used in the display device according to the first embodiment of the invention.

As shown in FIG. 5, the opposite substrate 201 comprises a black matrix 202 having a plurality of rectangular penetrating holes, patterned color layers 204 selectively formed in the respective penetrating holes of the black matrix 202, and the spacers 203. Each of the color layers 204 is surrounded by the black matrix 202. These elements placed on the opposite substrate 201 are formed on or over a transparent glass plate (not shown).

Each of the color layers 204 has one of three primary colors, i.e., red (R), green (G), and blue (B) colors. The color layers 204 are arranged to form a predetermined lattice-shaped pattern as a whole. The lattice-shaped pattern of the black matrix 202 is the same as that of the light-shielding portions 117 formed on the main substrate 101. The horizontal and vertical bar-shaped parts of the black matrix 202 are arranged at predetermined intervals along the x and y directions.

The lenticular lens 301 is constituted by connecting a plurality of lens elements 301a along one direction, where each of the lens element 301a is a convex cylindrical lens with a semicylindrical shape. The lenticular lens 301 is placed on the front of the display panel 100, in other words, on the surface of the display panel 100 closer to the opposite substrate 201. Each of the lens elements 301a separates an incoming image (or an incoming light beam) into two outgoing images (or two outgoing light beams) for the left and right sides with respect to the central axis of the element 301*a*, and emits respectively the two outgoing images thus generated toward the left eye (i.e., the first viewpoint) and the right eye (i.e., the second viewpoint). Therefore, the image separation axis of the lens element 301*a* is equal to the central axis of the element 301*a* extending along its longitudinal direction, which is parallel to the y direction. As explained later, the sub-pixel arrangement direction of each unit pixel 110 is along the x direction; therefore, the image separation axis of the lens element 301*a* and the sub-pixel arrangement direction are perpendicular to each other.

The lenticular lens 301 functions as an optical image separation element that separates an incoming image generated by the sub-pixel 106 for the left eye and the sub-pixel 107 for the right eye into two outgoing images, and that emits the outgoing images thus separated toward the left eye (i.e., the first viewpoint) and the right eye (i.e., the second viewpoint).

Figure 3:
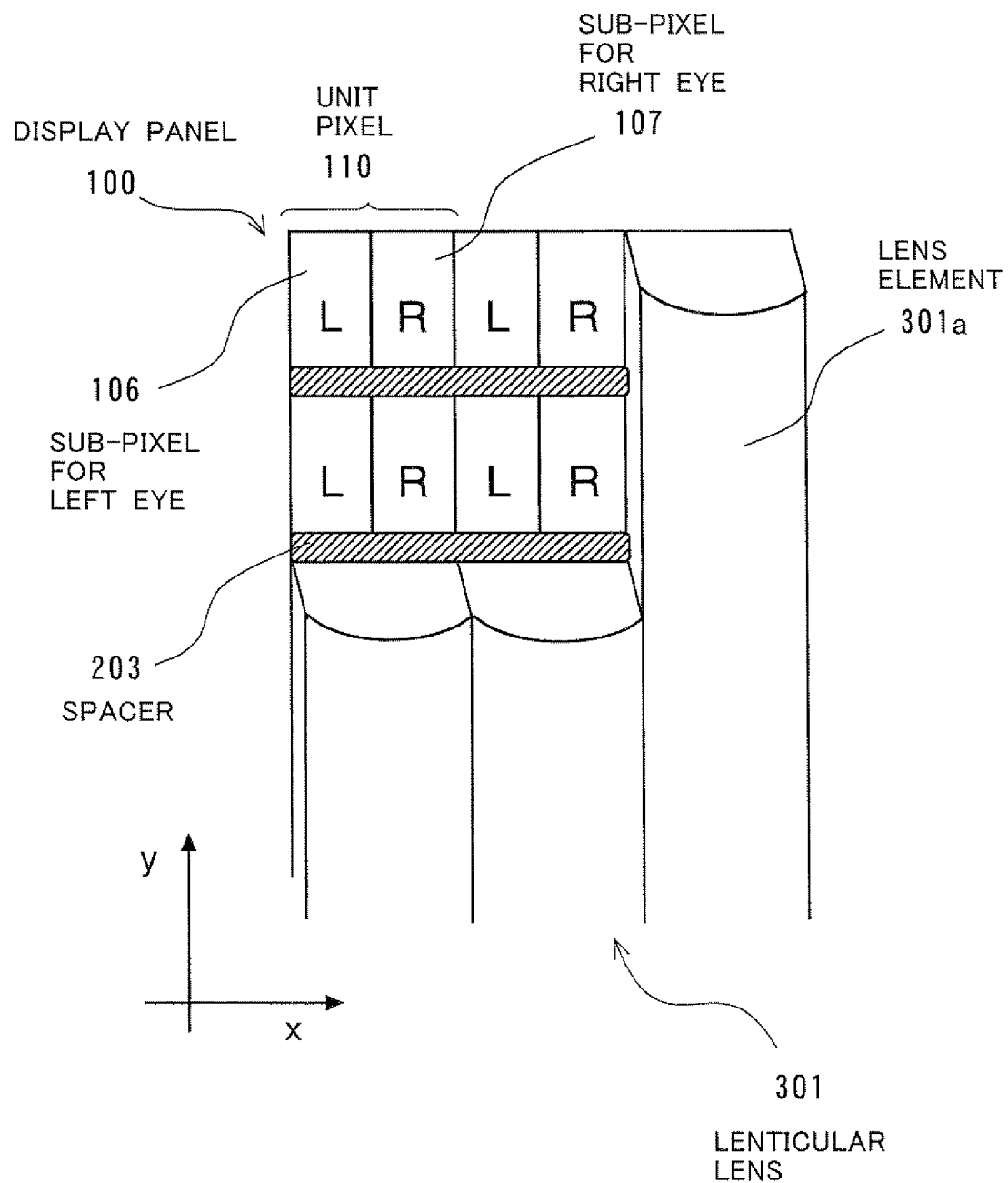
FIG. 3 is a partially cutaway explanatory view showing the pixel structure of the display panel used with a lenticular lens in a display device according to a first embodiment of the present invention.

The unit pixels 110 are formed on the display panel 100. As shown in FIG. 3, each of the unit pixels 110 is formed by the sub-pixel 106 for the left eye and the sub-pixel 107 for the right eye formed on the main substrate 101 adjacent to each other. The unit pixel 110 corresponds to one of the lens elements (i.e., the cylindrical lenses) 301*a* of the lenticular lens 301. In other words, the sub-pixel 106 for the left eye and the sub-pixel 107 for the right eye formed in the unit pixel 110 are overlapped with the corresponding lens element 301*a*. The sub-pixel 106 for the left eye and the sub-pixel 107 for the right eye are respectively overlapped with the corresponding color layers 204 placed on the opposite substrate 201 in a one-to-one correspondence.

All the unit pixels 110 placed on the display panel 100 are regularly arranged along the horizontal and vertical directions in such a way as to form a matrix. Therefore, the unit pixels 110 are arranged along the row direction of the matrix (i.e., the x direction) and at the same time, they are arranged along the column direction of the same matrix (i.e., the y direction). Since the sub-pixel 106 for the left eye and the sub-pixel 107 for the right eye that constitute the unit pixel 110 are alternately arranged along the row direction of the matrix, the arrangement direction of the sub-pixels 106 and 107 is the row direction of the matrix (i.e., the horizontal or x direction in FIG. 3).

Each of the spacers 203 is stripe-shaped in such a way as to extend continuously along the x direction over the entire matrix of the unit pixels 110. The spacers 203 are placed on the opposite substrate 201, as shown in FIG. 5. Each spacer 203 is overlapped with the lower ends of the sub-pixels 106 for the left eye and the sub-pixels 107 for the right eye aligned along the same row of the matrix. However, each spacer 203 is not overlapped with the horizontal bar-shaped parts of the black matrix 202 extending along the x direction. Each spacer 203 may be placed in such a way as to be overlapped with the horizontal bar-shaped parts of the black matrix 202 extending along the x direction.

It is usual that the spacers 203 are placed on an overcoat film (not shown), where the overcoat film is formed on the opposite substrate 201 to cover the black matrix 202 and the color layers 204. However, the present invention is not limited to this.

Here, the arrangement pitch of the unit pixels 110 along the sub-pixel arrangement direction (i.e., the x direction) is equal to the arrangement pitch of the lens elements 301*a* of the lenticular lens 301. However, the arrangement pitch of the unit pixels 110 along the sub-pixel arrangement direction may be different from the arrangement pitch of the lens elements 301*a* according to the observation distance.

FIG. 6 is a partial perspective view showing the combined state of the main substrate 101, the opposite substrate 201, and the lenticular lens 301.

Figure 7:
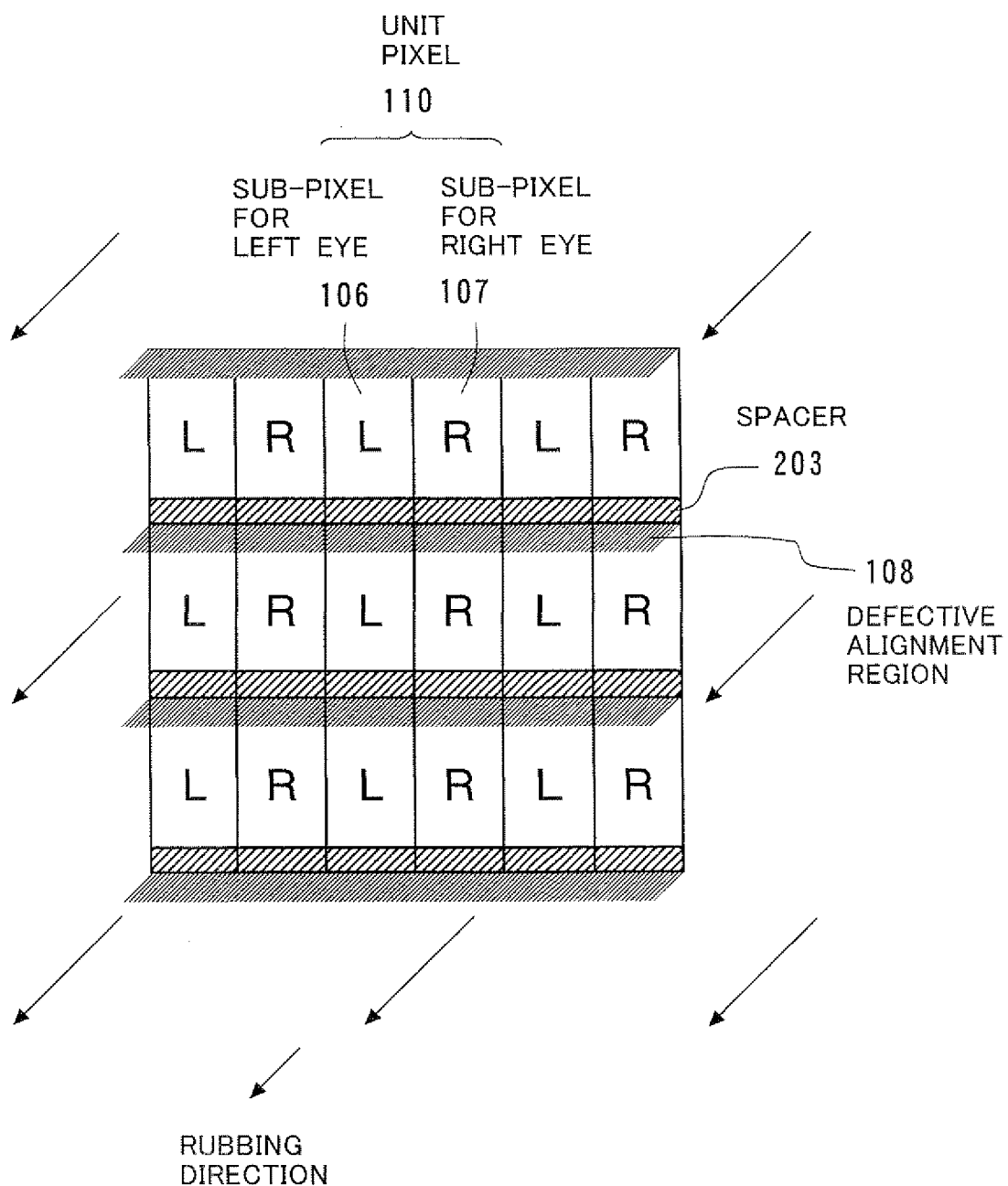
FIG. 7 is a schematic partial plan view showing the defective alignment regions to be formed near the columnar spacers in the rubbing process in the display device according to the first embodiment of the invention.

In the fabrication process sequence of the display panel 100, after completing the fabrication processes of the main and opposite substrates 101 and 201, alignment films (not shown) are respectively formed on the inner surfaces of the main and opposite substrates 101 and 201. Thereafter, to give the initial alignment to the liquid crystal molecules existing in the liquid crystal layer 404, a rubbing process along the rubbing direction of FIG. 7 is applied to each of these two alignment films. In the rubbing process, the pressing force of the rubbing material is insufficient in the regions 108 of the alignment film hidden behind the spacers 203 and as a result, the aligning function given to the alignment film is lower than that as desired. Accordingly, the desired aligning function is not applied to the regions 108, which means that the regions 108 of FIG. 7 are the defective alignment regions.

After the rubbing process for the aforementioned two alignment films is completed, the main substrate 101 and the opposite substrate 201 are coupled with each other using a sealing material (not shown) in a vacuum chamber (not show) in such a way that the display region is surrounded by the sealing material (not shown). A liquid crystal material is injected into the gap between the main and opposite substrates 101 and 201 thus coupled. Then, the sealing material is cured, thereby unifying the main and opposite substrates 101 and 201 and sealing the gap between the substrates 101 and 201. In this way, the liquid crystal layer 404 is formed between the substrates 101 and 201, completing the display panel 100.

Subsequently, the lenticular lens 301 is attached to the surface of the display panel 100 located on the opposite substrate 201 (i.e., the front of the display panel 100). A predetermined driver LSI and a backlight unit are mounted on the display panel 100. Thus, the display device according to the first embodiment shown in FIGS. 3 to 6 is finished.

Figure 8:
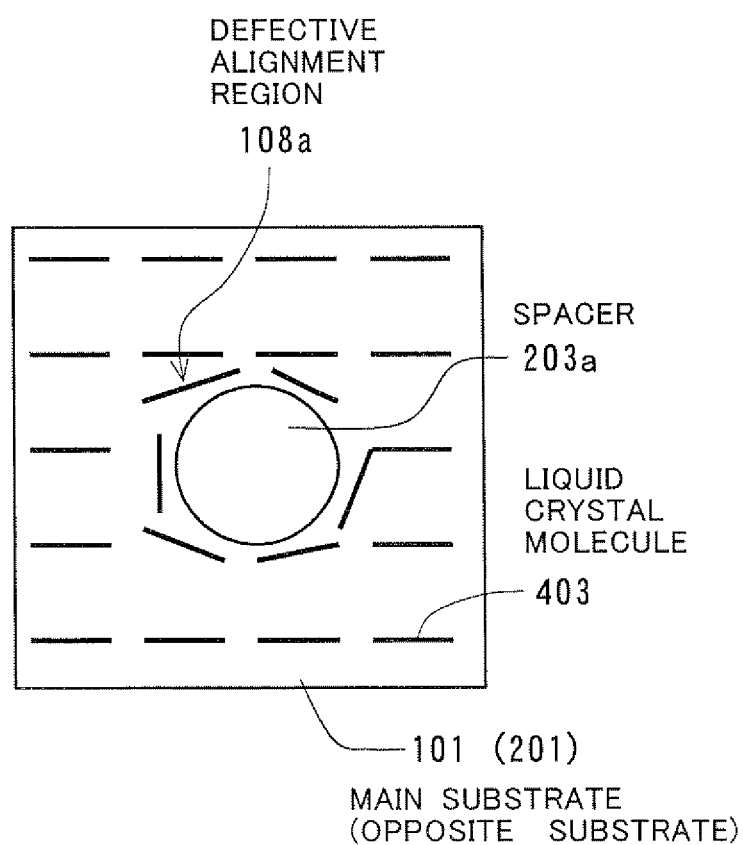
FIG. 8 is a schematic partial plan view showing the defective alignment regions formed near the columnar spacers in the display device according to the first embodiment of the invention.
Figure 9:
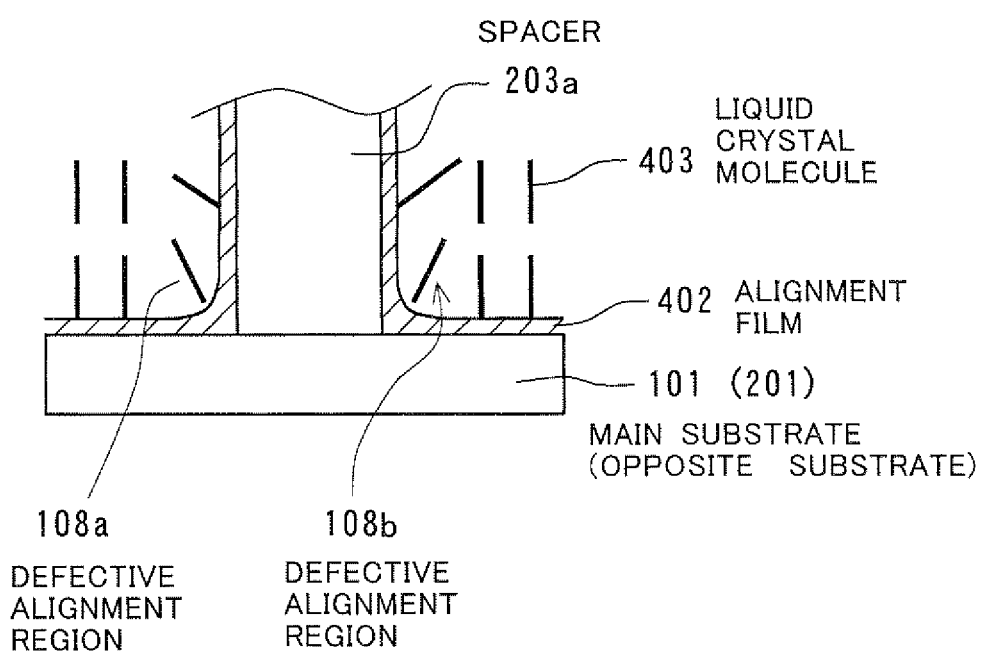
FIG. 9 is a schematic partial cross-sectional view showing the defective alignment regions formed near the columnar spacers in the display device according to the first embodiment of the invention.

FIGS. 8 and 9 show the alignment state of the liquid crystal molecules 403 existing in the periphery of the columnar spacer 203*a*. Here, this spacer 203*a* has a form of circular cylinder for facilitating the explanation.

FIG. 8 shows the state of the liquid crystal molecules 403 in the periphery of the columnar spacer 203*a*, where the molecules 403 are aligned parallel to the main substrate 101 (and the opposite substrate 201). As seen from FIG. 8, the alignment of the liquid crystal molecules 403 is disturbed in the periphery of the spacer 203*a*. In other words, a defective alignment region 108*a* is formed in the periphery of the spacer 203*a*.

FIG. 9 shows the state of the liquid crystal molecules 403 in the periphery of the columnar spacer 203*a*, where the molecules 403 are aligned perpendicular to the main substrate 101 (and the opposite substrate 201). As seen from FIG. 9, the alignment of the liquid crystal molecules 403 is disturbed in the periphery of the spacer 203*a* due to the effect of the alignment film 402 existing on the outer side face of the spacer 203*a*. In other words, a defective alignment region 108*b* is formed in the periphery of the spacer 203*a*.

If the pixel resolution is low, the defective alignment regions 108, 108*a*, and 108*b* shown in FIGS. 7 to 9 can be hidden (i.e., optically shielded) by increasing the occupation area of the black matrix 202 shown in FIG. 5. However, if the pixel resolution is high, such the increase of the occupation area of the black matrix 202 induces the aperture ratio lowering significantly. For this reason, there is a possibility that all the defective alignment regions 108, 108a, and 108b are difficult to be hidden (i.e., optically shielded). In such the situation, when an image for one of the left and right eyes contains the defective alignment regions 108, 108a, and/or 108b and another image for the other does not contain the defective alignment regions 108, 108a, and/or 108b, display unevenness and/or disclination may be recognizable by a viewer. Even if display unevenness and/or disclination generated by one of the aforementioned two images is/are at a very slight level or levels and unrecognizable by the viewer, display unevenness and/or disclination generated by the aforementioned two images may be recognizable by the viewer. In particular, such the tendency will become stronger when two-dimensional images are displayed in a display device having the same resolution for displaying two-dimensional images as that for displaying three-dimensional images (see the Patent Document 1).

On the other hand, with the display device according to the first embodiment, the spacers 203 formed on the opposite substrate 201 are located near the light-shielding portions 117 in the boundaries of the adjoining unit pixels 110. Moreover, the spacers 203 are stripe-shaped in such a way as to extend continuously along the x direction over the full widths of the respective unit pixels 110. Therefore, each of the spacers 203 exists equally in the sub-pixel 106s for the left eye and the sub-pixels 107 for the right eye. Accordingly, even if the defective alignment regions 108, 108a, and 108b are present, the displayed image for the left eye and that for the right eye are equally affected by the spacers 203. As a result, it is difficult for the viewer to recognize the difference between the displayed images for the left and right eyes. In other words, display unevenness caused by the spacers 203 does not change dependent on the observation position.

To suppress the effect of the defective alignment regions 108, 108a, and 108b furthermore, the focal length of each lens element 301a of the lenticular lens 301 may be different from the distance between the lens element 301a and the corresponding unit pixel 110.

Figure 10:
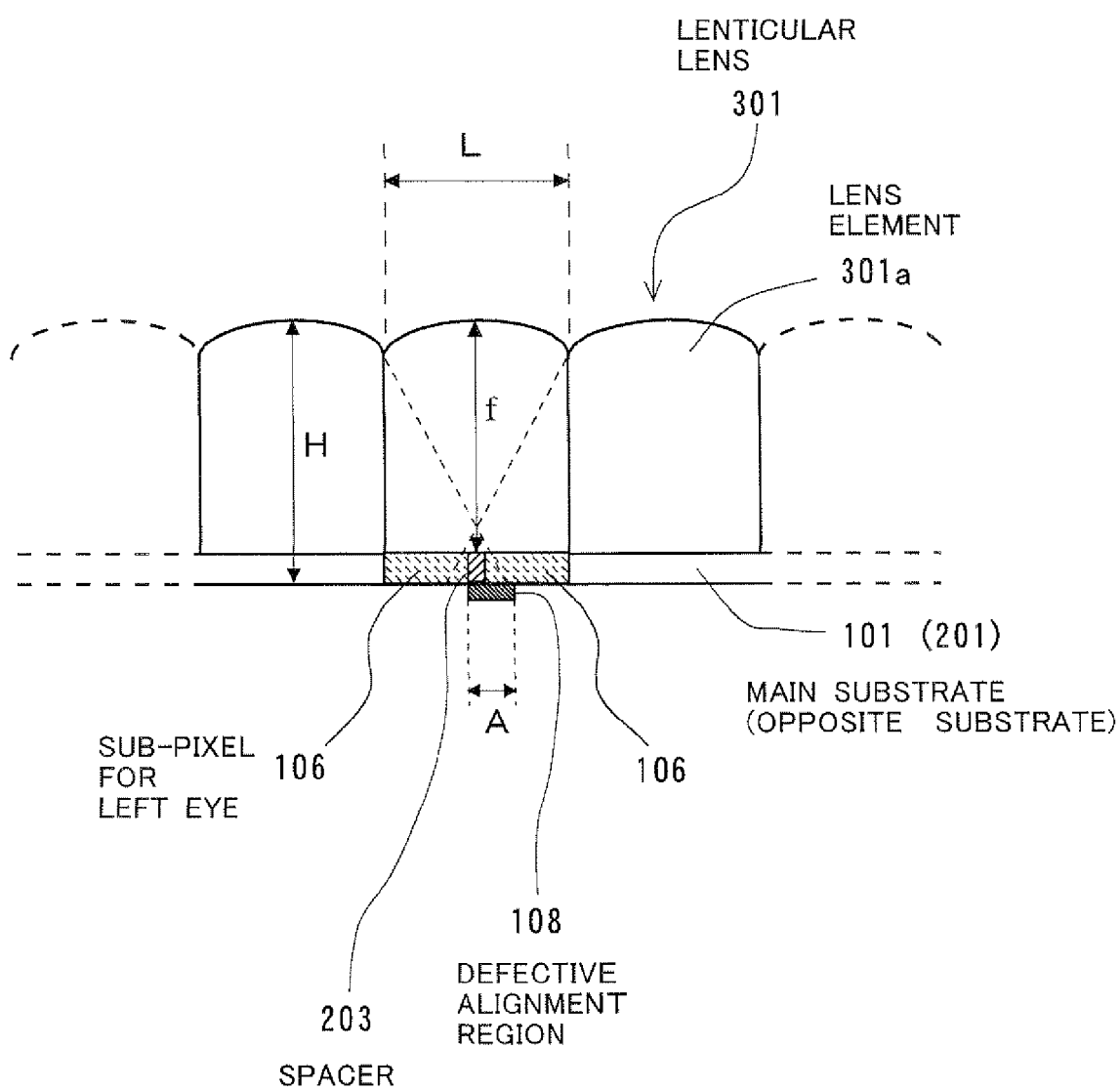
FIG. 10 is an explanatory view showing the relationship among the pitch L of the lens elements, the width A of the defective alignment region, the focal length f of the lens elements, and the distance H between the lens elements and the pixels in the display device according to the first embodiment of the invention.

As shown in FIG. 10, when the size (in other words, the length along the x direction) of the defective alignment region 108, 108a, or 108b is defined as A, the arrangement pitch and the focal length of the lens elements 301a of the lenticular lens 301 are respectively defined as L and f, and the distance between the lens element 301a and the corresponding unit pixel 110 is defined as H, it is preferred that the distance H is set to satisfy the following relationship.

$f < L \times H/(L+A)$

With the display device according to the first aspect of the present invention shown in FIGS. 3 to 6, as explained above, each of the unit pixels 110 of the display unit 100 includes the sub-pixel 106 for the left eye (i.e., the first viewpoint) and the sub-pixel 107 for the right eye (i.e., the second viewpoint). The spacers 203 arranged at the predetermined positions in the gap of the display panel 100 are stripe-shaped in such a way as to be extended along the x direction perpendicular to the image separation axis of the lenticular lens (i.e., the optical image separation element) 301. Moreover, the spacers 203 are equally overlapped with or overlaid on the sub-pixels 106 for the left eye and the sub-pixels 107 for the right eye. Therefore, the defective alignment regions 108, 108a, and 108b induced by the spacers 203 exist equally in the sub-pixels 106 for the left eye and the sub-pixels 107 for the right eye and as a result, the display quality can be prevented from changing dependent on the observation position.

Moreover, because the display quality can be prevented from changing dependent on the observation position, as described above, the effect of the defective alignment regions 108, 108a, and 108b can be suppressed, even if all the defective alignment regions 108, 108a, and 108b are not optically shielded. This means that it is sufficient for this purpose to optically shield the defective alignment regions 108, 108a, and 108b partially. Accordingly, the effect of the defective alignment regions 108, 108a, and 108b can be suppressed while minimizing the aperture ratio lowering, which makes it possible to reduce the image quality degradations.

Furthermore, the spacers 203 are stripe-shaped in such a way as to be extended along the x direction perpendicular to the image separation axis of the lenticular lens (i.e., the optical image separation element) 301. The spacers 203 are equally overlapped with or overlaid on the sub-pixels 106 for the left eye and the sub-pixels 107 for the right eye. Therefore, the non-light-transmission portions generated in the unit pixels 110 will not be so large. This means that there is no possibility that the non-light-transmission regions are generated at the front of the display device according to the first embodiment.

In addition, even if some difference occurs between the pitch of the unit pixels 110 (i.e., the lens elements 301a of the lenticular lens 301) and that of the sub-pixels 106 and 107, the non-displayable regions where desired images are unable to be displayed due to overlapping the spacers 203 with the sub-pixels 106 and 107 are not formed.

Accordingly, the problems arisen from the placement of the spacers 13 in the two forms of the related-art three-dimensional LCD devices disclosed in the aforementioned Patent Document 2 can be avoided.

Although the lenticular lens 301 is used as the optical image separation element in the display device according to the first embodiment, a known parallax barrier may be used instead of the lenticular lens 301. The spacers 203 are placed on the opposite substrate 201 in the display device according to the first embodiment; however, the spacers 203 may be placed on the main substrate 101.

Second Embodiment

Figure 11:
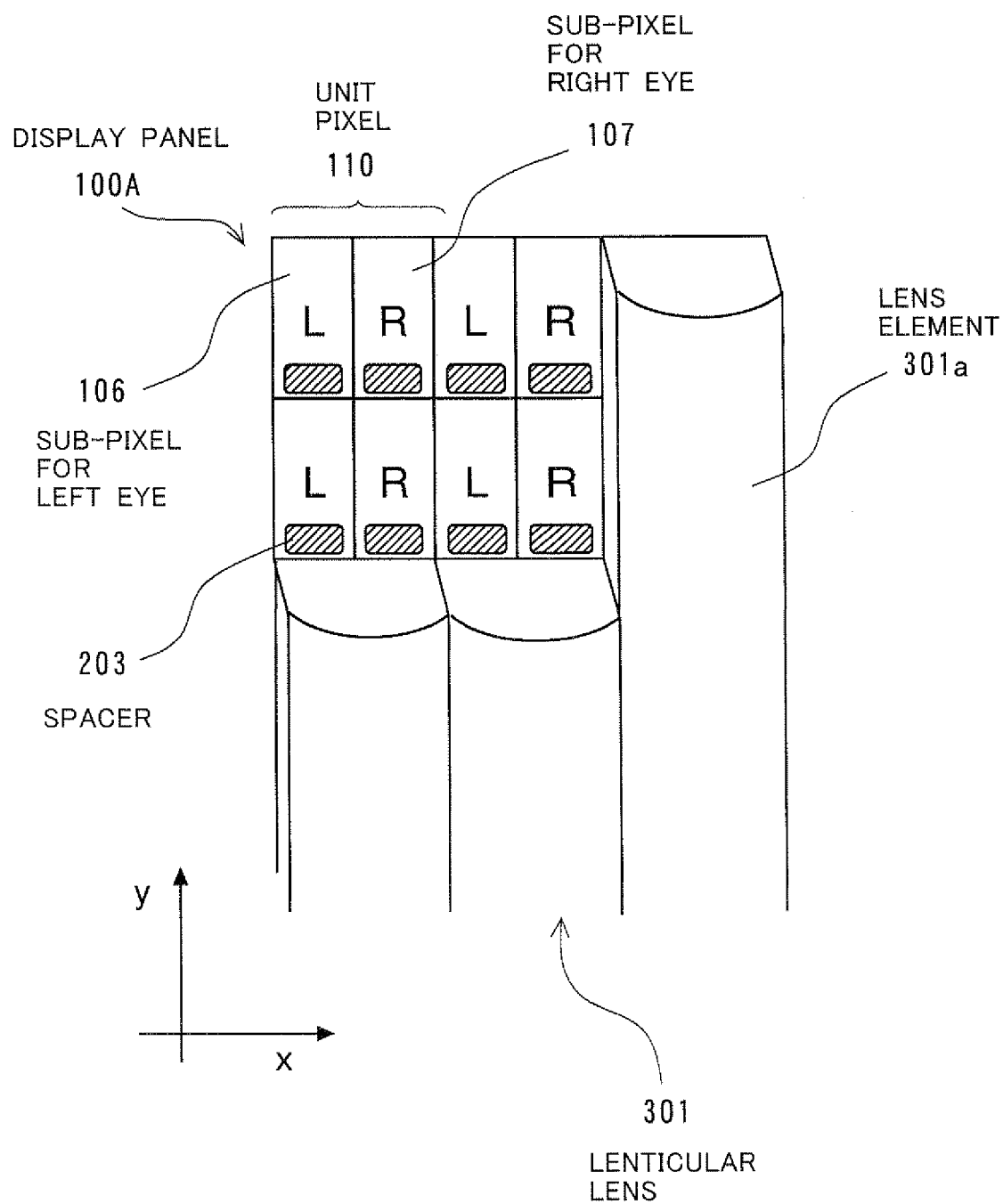
FIG. 11 is a partially cutaway explanatory view showing the pixel structure of the display panel used with the lenticular lens in a display device according to a second embodiment of the present invention.
Figure 12:
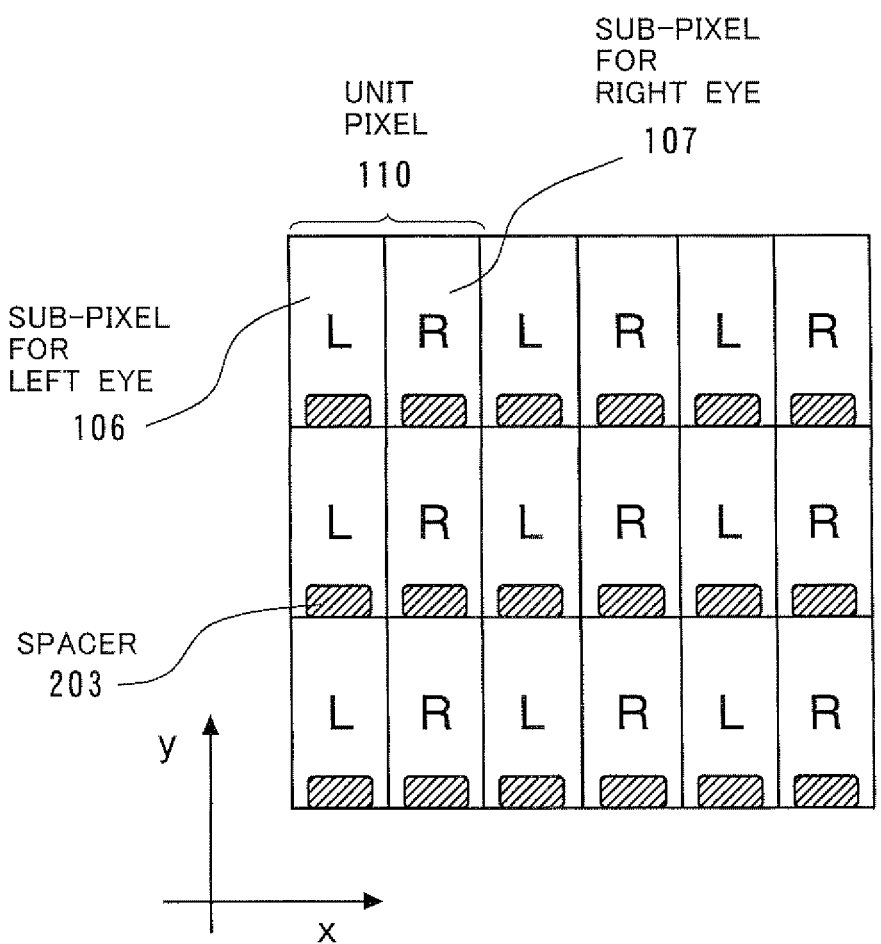
FIG. 12 is a partial explanatory plan view showing the pixel structure of the display panel used in the display device according to the second embodiment of the invention, where one spacer is placed in each sub-pixel.

FIGS. 11 and 12 show the pixel structure of the display panel 100A used in a display device according to a second embodiment of the present invention.

The display panel 100A according to the second embodiment is the same as the display panel 100 according to the aforementioned first embodiment except that the spacers 203, which are extended along the x direction in the form of stripes in the first embodiment, are divided into parts for the respective sub-pixels 106 and 107. In other words, the display panel 100A comprises the discontinuous or isolated spacers 203 in the respective sub-pixels 106 for the left eye and the respective sub-pixels 107 for the right eye, where these isolated spacers 203 are arranged along the x direction at the predetermined intervals. Accordingly, the explanation about the same structural components will be omitted here by attaching the same reference numerals as used in the first embodiment to these components.

It is apparent that the same advantages as those of the aforementioned first embodiment are obtainable in the display device according to the second embodiment shown in FIGS. 11 and 12.

Figure 13:
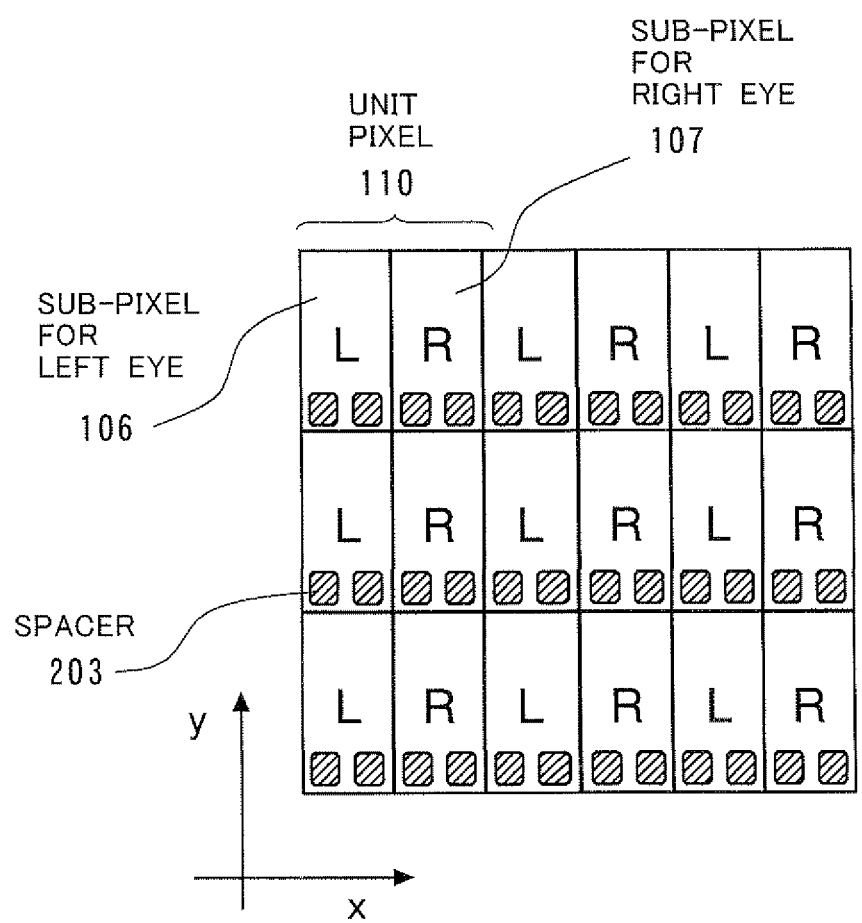
FIG. 13 is a partial explanatory plan view showing a variation of the pixel structure of the display panel used in the display device according to the second embodiment of the invention, where two spacers are placed in each sub-pixel

FIG. 13 shows a variation of the display device according to the second embodiment. With the display device according to the second embodiment of FIGS. 11 and 12, the isolated spacers 203 are arranged in the respective sub-pixels 106 and 107 of the unit pixels 110 in a one-to-one correspondence; in other words, one isolated spacer 203 is assigned to each of the sub-pixels 106 and 107. Unlike this, in this variation, two isolated spacers 203 are assigned to each of the sub-pixels 106 and 107, where these two spacers are apart from each other along the x direction. It may be said that these isolated spacers 203 are arranged in the respective sub-pixels 106 and 107 in a two-to-one correspondence. In this way, a plurality of isolated spacers 203 may be assigned to each of the sub-pixels 106 and 107 in the present invention. A plurality of isolated spacers 203 assigned to each of the sub-pixels 106 and 107 may be shifted along the y direction in the said sub-pixel 106 or 107.

In the second embodiment and the aforementioned variation, the spacer 203 may have any shape, such as circular pillar, square pillar, or elliptic pillar. The spacer 203 may have any tapered shape along the height direction thereof across the substrate gap. These two points may be applied to other embodiments described here.

Third Embodiment

Figure 14:
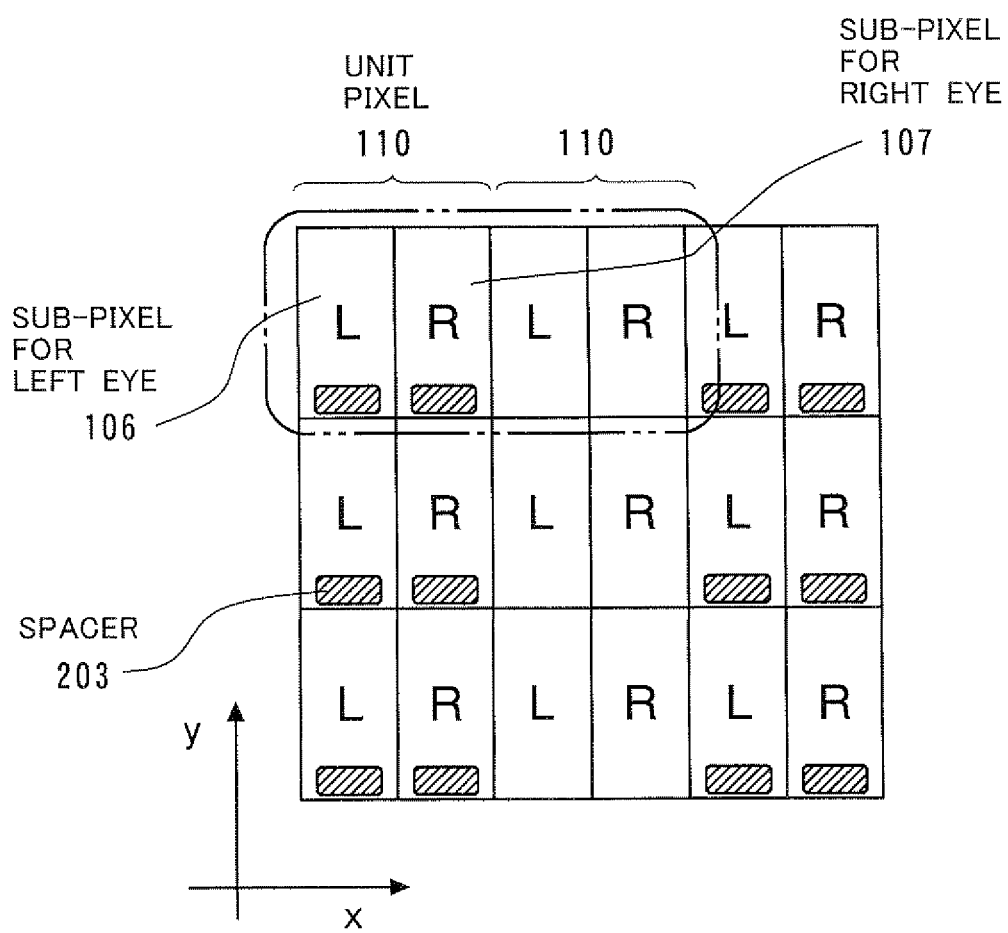
FIG. 14 is a partial explanatory plan view showing the pixel structure of the display panel used in a display device according to a third embodiment of the invention, where the columns of the unit pixels including the spacers and the columns of the unit pixels including no spacer are alternately arranged.

FIG. 14 shows the pixel structure of the display panel used in a display device according to a third embodiment of the present invention. FIGS. 15 to 18 show first to fourth variations of the structure of the display panel of FIG. 14, respectively.

With the structure of FIG. 14, the display panel comprises the unit pixels 110 each including two isolated spacers 203 and the unit pixels 110 including no spacers. The structure of each unit pixel 110 including the isolated spacers 203 is the same as that used in the aforementioned second embodiment shown in FIGS. 11 and 12. Specifically, one isolated spacer 203 is assigned to the sub-pixel 106 for the left eye of the unit pixel 110 and another isolated spacer 203 is assigned to the sub-pixel 107 for the right eye thereof.

The unit pixels 110 including the isolated spacers 203 are arranged along one column of the matrix (i.e., the y direction), which constitute the first pixel group. The unit pixels 110 including no spacers are arranged along another adjacent column of the matrix (i.e., the y direction), which constitute the second pixel group. The unit pixels 110 in the first group and the unit pixels 110 in the second pixel group are alternately arranged along the x direction (i.e., the rows of the matrix) at equal intervals, forming the matrix of the unit pixels 110, as shown in FIG. 14.

In the pixel structure of FIG. 14, the two unit pixels 110 included in one row and two columns of the matrix adjacent to each other, i.e., the (1×2) unit pixels 110, compensates the effect of the defective alignment regions 108, 108a, and 108b induced by the spacers 203.

Figure 15:
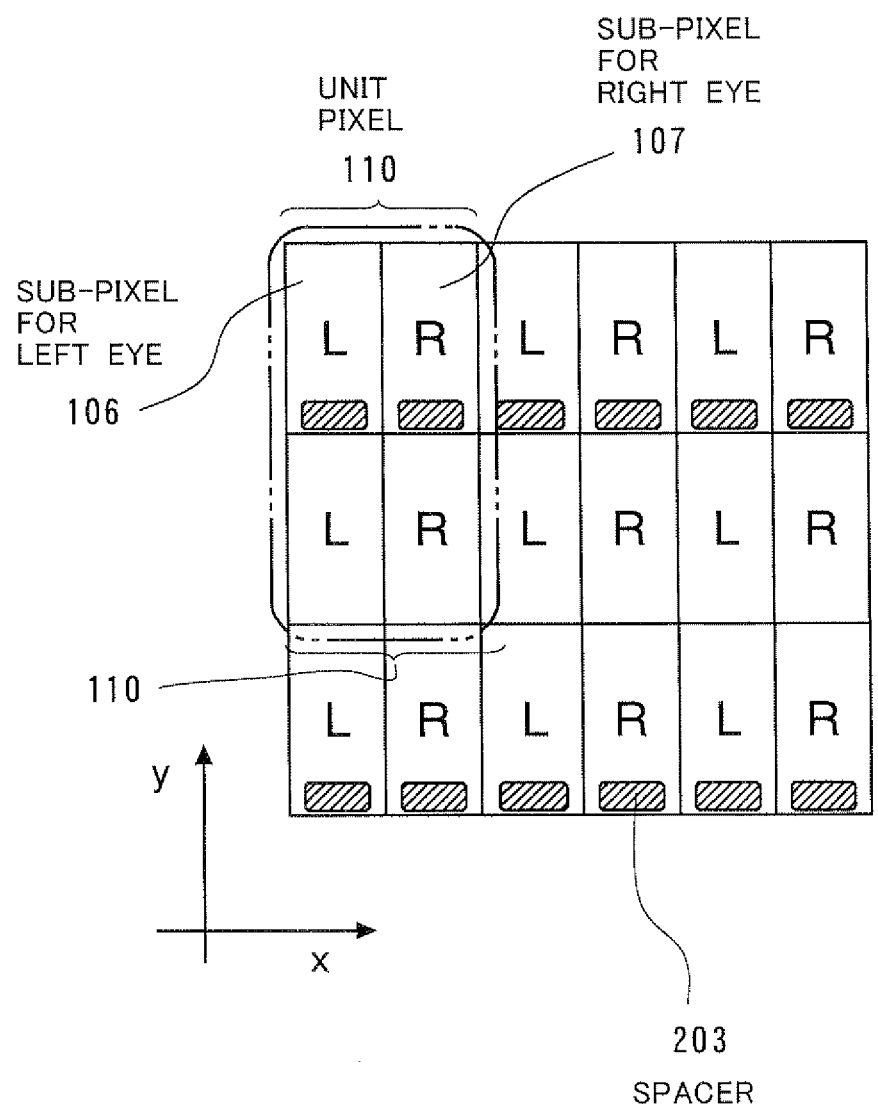
FIG. 15 is a partial explanatory plan view showing a first variation of the pixel structure of the display panel used in the display device according to the third embodiment of the invention, where the rows of the unit pixels including the spacers and the rows of the unit pixels including no spacer are alternately arranged.

With the structure of FIG. 15 also, the display panel comprises the unit pixels 110 each including two isolated spacers 203 and the unit pixels 110 including no spacers. The structure of each unit pixel 110 including the isolated spacers 203 is the same as that used in the aforementioned second embodiment shown in FIGS. 11 and 12.

The unit pixels 110 including the isolated spacers 203 are arranged along one row of the matrix (i.e., the x direction), which constitute the first pixel group. The unit pixels 110 including no spacers are arranged along another adjacent row of the matrix (i.e., the x direction), which constitute the second pixel group. The unit pixels 110 in the first group and the unit pixels 110 in the second pixel group are alternately arranged along the y direction (i.e., the columns of the matrix) at equal intervals, forming the matrix of the unit pixels 110.

In the pixel structure of FIG. 15, the two unit pixels 110 included in two rows and one column of the matrix adjacent to each other, i.e., the (2×1) unit pixels 110, compensates the effect of the defective alignment regions 108, 108a, and 108b induced by the spacers 203.

Figure 16:
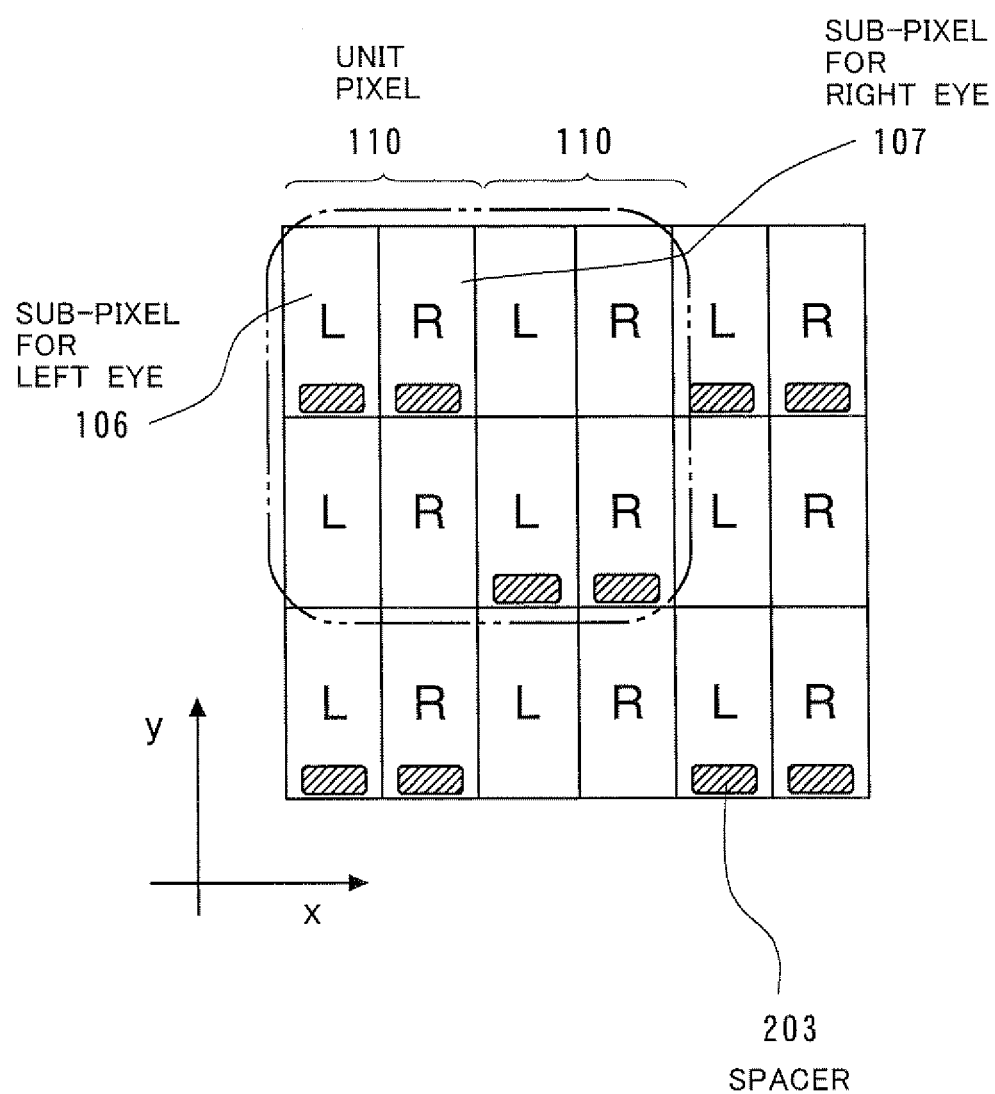
FIG. 16 is a partial explanatory plan view showing a second variation of the pixel structure of the display panel used in the display device according to the third embodiment of the invention, where the unit pixels including the spacers and the unit pixels including no spacer are alternately arranged in such a way as to form a checkered pattern.

With the structure of FIG. 16 also, the display panel comprises the unit pixels 110 each including two isolated spacers 203 and the unit pixels 110 including no spacers. The structure of each unit pixel 110 including the isolated spacers 203 is the same as that used in the aforementioned second embodiment shown in FIGS. 11 and 12.

The unit pixels 110 including the isolated spacers 203 are alternately arranged along one row of the matrix (i.e., the x direction), which constitute the first pixel group. The unit pixels 110 including no spacers are alternately arranged along another adjacent row of the matrix (i.e., the x direction), which constitute the second pixel group. The unit pixels 110 in the first group and the unit pixels 110 in the second pixel group are alternately arranged along the y direction (i.e., the columns of the matrix) at equal intervals in such a way as to form a checkered pattern, forming the matrix of the unit pixels 110.

In the pixel structure of FIG. 16, the four unit pixels 110 included in two rows and two columns of the matrix adjacent to each other, i.e., the (2×2) unit pixels 110, compensates the effect of the defective alignment regions 108, 108a, and 108b induced by the spacers 203.

Figure 17:
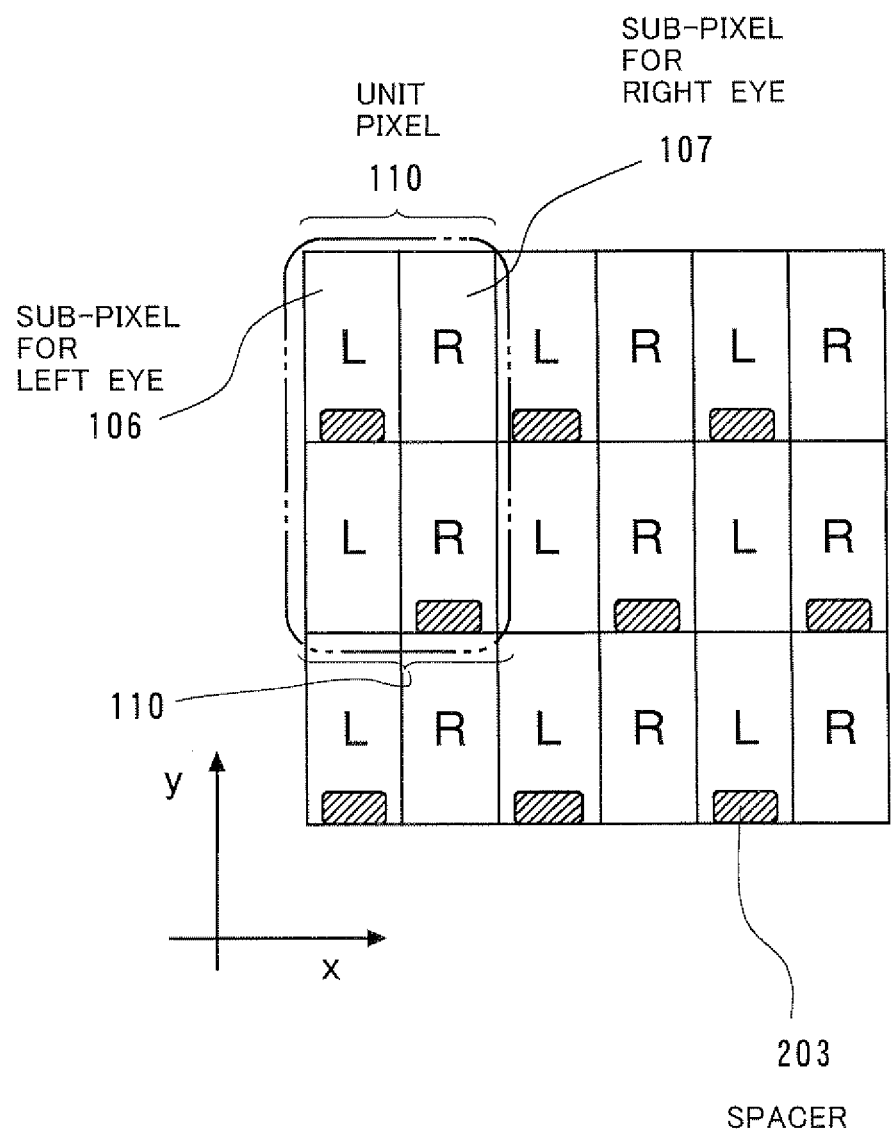
FIG. 17 is a partial explanatory plan view showing a third variation of the pixel structure of the display panel used in the display device according to the third embodiment of the invention, where the unit pixels including the spacers only in the sub-pixels for the left eye and the unit pixels including the spacers only in the sub-pixels for the right eye are alternately arranged.

With the structure of FIG. 17, the display panel comprises the unit pixels 110 each including one isolated spacer 203 in the sub-pixel 106 for the left eye, and the unit pixels 110 each including one isolated spacer 203 in the sub-pixel 107 for the right eye. Therefore, the structure of each unit pixel 110 including the isolated spacer 203 is different from that used in the aforementioned second embodiment shown in FIGS. 11 and 12.

The unit pixels 110 each including the isolated spacer 203 in the sub-pixel 106 are arranged along one row of the matrix (i.e., the x direction), which constitute the first pixel group. The unit pixels 110 each including the isolated spacer in the sub-pixel 107 are arranged along another adjacent row of the matrix (i.e., the x direction), which constitute the second pixel group. The unit pixels 110 in the first group and the unit pixels 110 in the second pixel group are alternately arranged along the y direction (i.e., the columns of the matrix), forming the matrix of the unit pixels 110, as shown in FIG. 17.

In the pixel structure of FIG. 17, the two unit pixels 110 included in two rows and one column of the matrix adjacent to each other, i.e., the (2×1) unit pixels 110, compensates the effect of the defective alignment regions 108, 108a, and 108b induced by the spacers 203.

Figure 18:
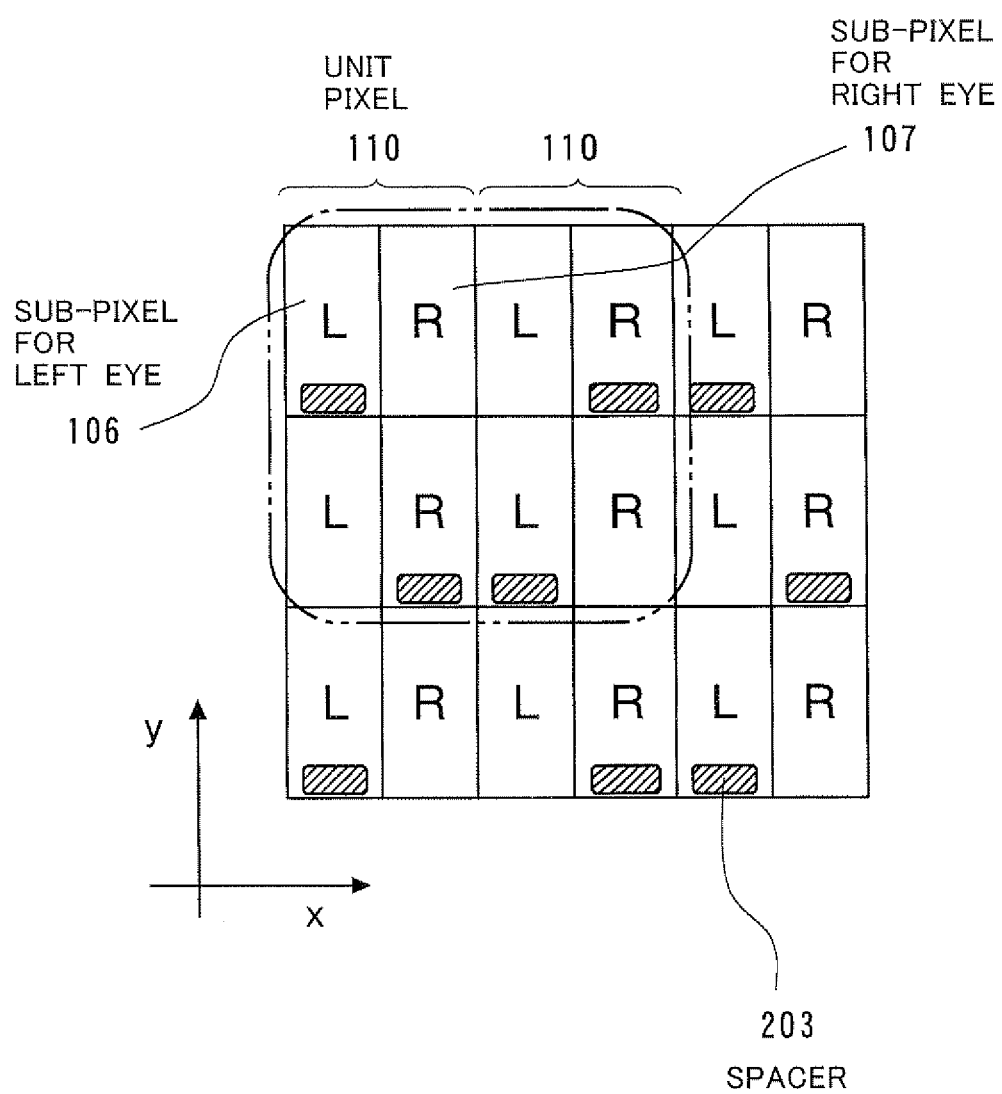
FIG. 18 is a partial explanatory plan view showing a fourth variation of the pixel structure of the display panel used in the display device according to the third embodiment of the invention, where the unit pixels including the spacers only in the sub-pixels for the left eye and the unit pixels including the spacers only in the sub-pixels for the right eye are alternately arranged in each row, and the positions of the spacers in the unit pixel are inverted in each column.

With the structure of FIG. 18, like the structure of FIG. 17, the display panel comprises the unit pixels 110 each including one isolated spacer 203 in the sub-pixel 106 for the left eye, and the unit pixels 110 each including one isolated spacer 203 in the sub-pixel 107 for the right eye. However, the layout of the unit pixels 110 is different from that of FIG. 17.

Specifically, the unit pixels 110 each including the isolated spacer 203 in the sub-pixel 106 and the unit pixels 110 each including the isolated spacer 203 in the sub-pixel 107 are alternately arranged in this order along one row of the matrix (i.e., the x direction), which constitute the first pixel group. The unit pixels 110 each including the isolated spacer in the sub-pixel 107 and the unit pixels 110 each including the isolated spacer 203 in the sub-pixel 106 are alternately arranged in this order along another adjacent row of the matrix (i.e., the x direction), which constitute the second pixel group. The unit pixels 110 in the first group and the unit pixels 110 in the second pixel group are alternately arranged along the y direction (i.e., the columns of the matrix), where the position of the spacer 203 assigned to the sub-pixel 106 or 107 is inverted every row and every column, forming the matrix of the unit pixels 110, as shown in FIG. 18.

In the pixel structure of FIG. 18, the four unit pixels 110 included in two rows and two columns of the matrix adjacent to each other, i.e., the (2×2) unit pixels 110, compensates the effect of the defective alignment regions 108, 108a, and 108b induced by the spacers 203.

With the display device according to the third embodiment and its first and fourth variations also, it is apparent that the same advantages as those of the aforementioned first embodiment are obtainable. In addition, the following advantage is obtainable.

Specifically, it becomes more difficult to distinguish the difference between the pixels as the pixel resolution becomes higher. Therefore, when the unit pixels 110 each including one isolated spacer 203 in the sub-pixel 106 for the left eye and the unit pixels 110 each including one isolated spacer 203 in the sub-pixel 107 for the right eye are combined, as shown in the third and fourth variations of the third embodiment of FIGS. 17 and 18, the aperture ration can be raised furthermore and the effect of the defective alignment regions 108, 108a, and 108b can be suppressed still more.

In addition, with the display device according to the third embodiment and its first and fourth variations, as long as the gag uniformity between the main substrate 101 and the opposite substrate 201 is kept, the spacers 203 may be arranged in such a way that two or more sub-pixels 106 including no spacer and/or 107 (each of which includes no spacer) are located between the adjacent spacers 203 along the rows and/or columns of the matrix.

Fourth Embodiment

Figure 19:
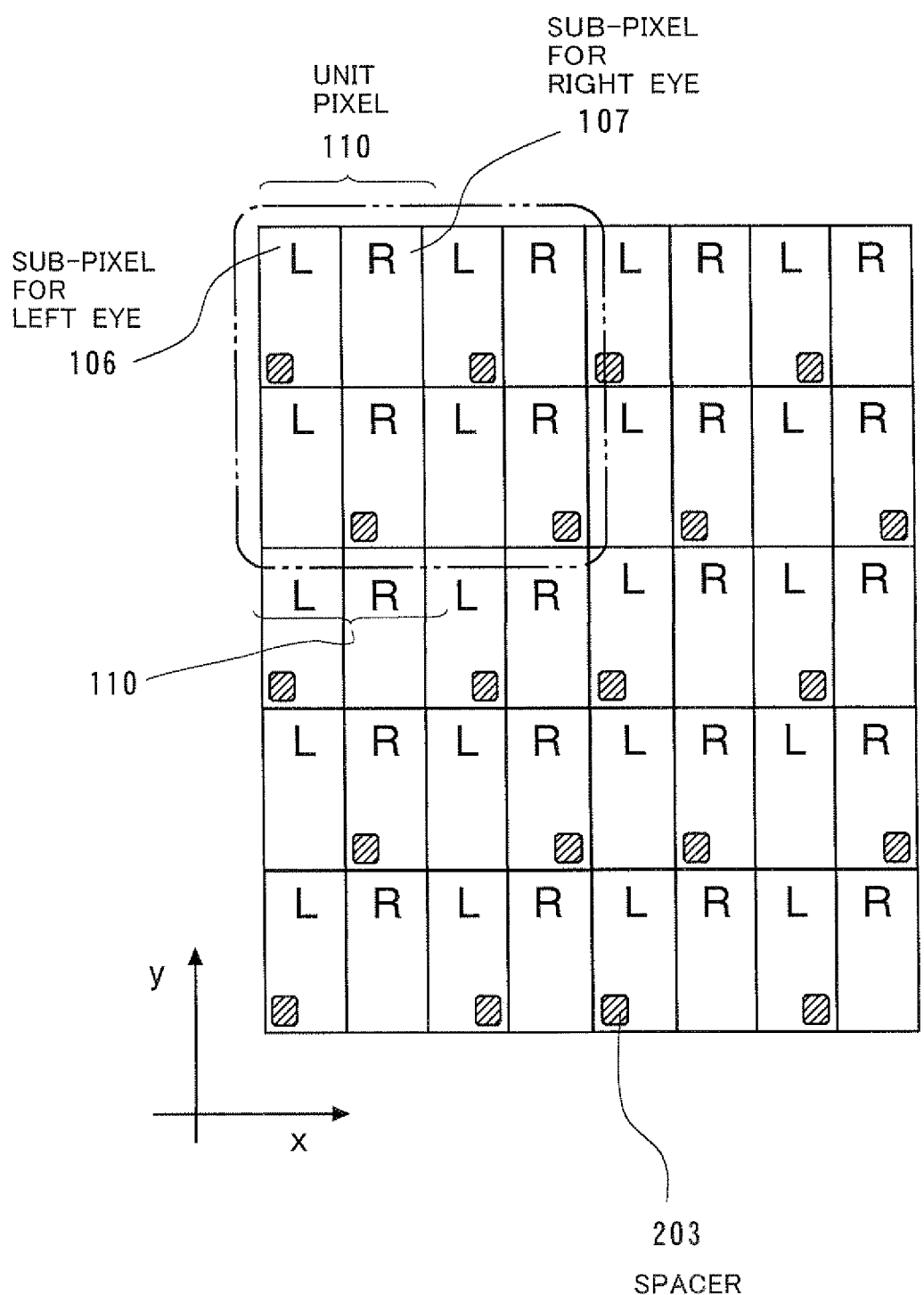
FIG. 19 is a partial explanatory plan view showing the pixel structure of the display panel used in a display device according to a fourth embodiment of the invention, where the effect of the spacers is compensated by using the 2×2 unit pixels consisting of two rows and two columns.
Figure 20:
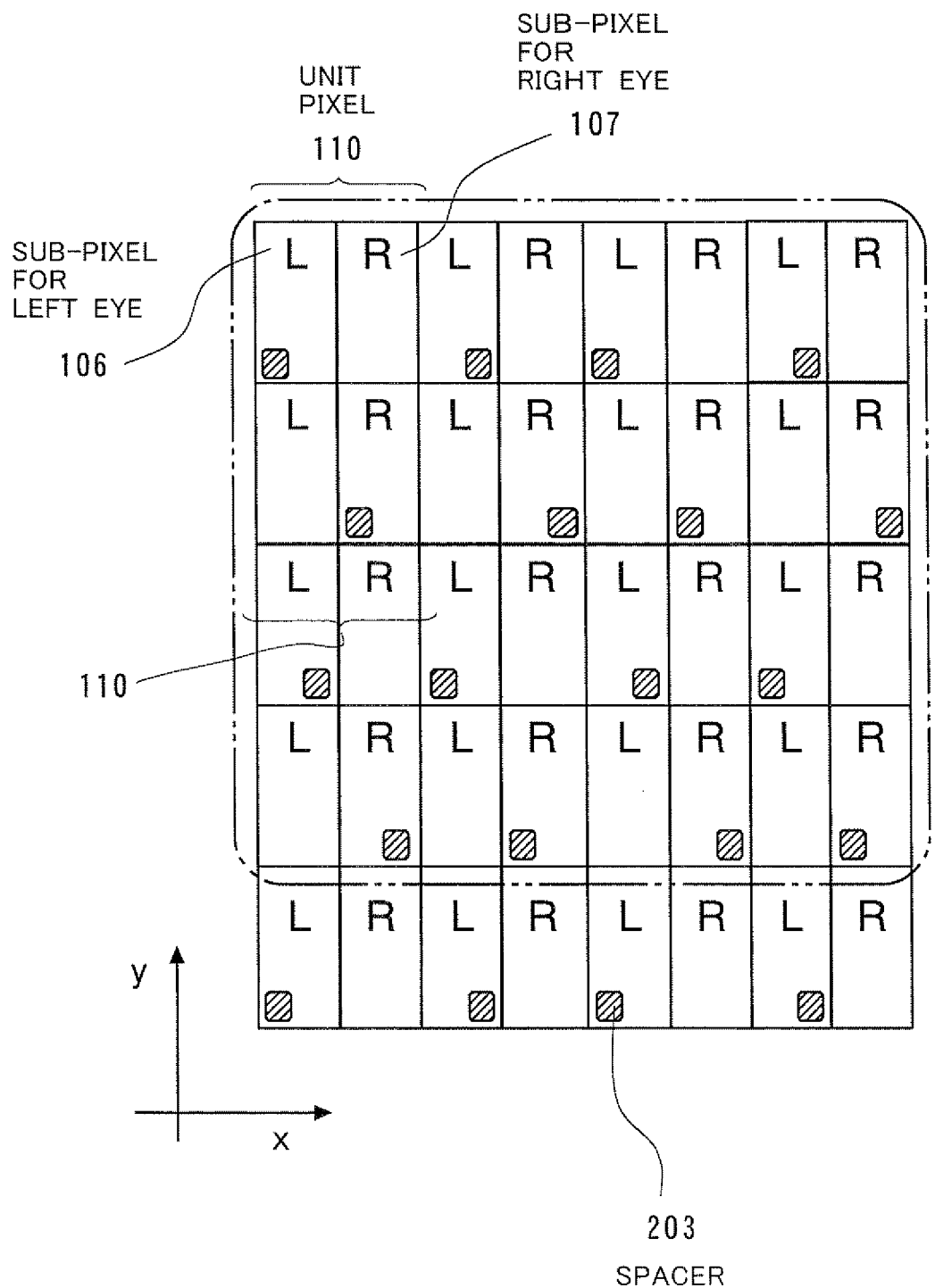
FIG. 20 is a partial explanatory plan view showing a variation of the pixel structure of the display panel used in the display device according to the fourth embodiment of the invention, where the effect of the spacers is compensated by using the 4×4 unit pixels consisting of four rows and four columns.

FIG. 19 shows the pixel structure of the display panel used in a display device according to a fourth embodiment of the present invention. FIG. 20 shows a variation of the structure of this display panel.

With the structure of FIG. 19, the display panel comprises the unit pixels 110 each including one isolated spacer 203 in the sub-pixel 106 for the left eye, and the unit pixels 110 each including one isolated spacer 203 in the sub-pixel 107 for the right eye. This structure is similar to that of FIG. 17, where the spacer 203 in FIG. 19 is approximately equal in size to a half of the spacer 203 in FIG. 17.

The unit pixels 110 each including the isolated spacer 203 in the sub-pixel 106 for the left eye are arranged along one row of the matrix (i.e., the x direction), which constitute the first pixel group. The unit pixels 110 each including the isolated spacer in the sub-pixel 107 for the right eye are arranged along another adjacent row of the matrix (i.e., the x direction), which constitute the second pixel group. The unit pixels 110 in the first group and the unit pixels 110 in the second pixel group are alternately arranged along the y direction (i.e., the columns of the matrix).

In each unit pixel 110 belonging to the first pixel group, the isolated spacer 203 placed in the sub-pixel 106 is shifted to the vicinity of one side edge of this sub-pixel 106 or to the vicinity of the other side edge thereof along the x direction. The spacers 203 are alternately located at these two positions along the x direction.

Similarly, in each unit pixel 110 belonging to the second pixel group, the isolated spacer 203 placed in the sub-pixel 107 is shifted to the vicinity of one side edge of this sub-pixel 107 or to the vicinity of the other side edge thereof along the x direction. The spacers 203 are alternately located at these two positions along the x direction.

In the pixel structure of FIG. 19, the four unit pixels 110 included in two rows and two columns of the matrix adjacent to each other, i.e., the (2×2) unit pixels 110, compensates the effect of the defective alignment regions 108, 108a, and 108b.

With the structure of FIG. 20, like the structure of FIG. 19, the display panel comprises the unit pixels 110 each including one isolated spacer 203 in the sub-pixel 106 for the left eye, and the unit pixels 110 each including one isolated spacer 203 in the sub-pixel 107 for the right eye.

The unit pixels 110 each including the isolated spacer 203 in the sub-pixel 106 for the left eye are arranged along one row of the matrix (i.e., the x direction), which constitute the first pixel group. The unit pixels 110 each including the isolated spacer 203 in the sub-pixel 107 for the right eye are arranged along another adjacent row of the matrix (i.e., the x direction), which constitute the second pixel group. The unit pixels 110 in the first group and the unit pixels 110 in the second pixel group are alternately arranged along the y direction (i.e., the columns of the matrix).

In each unit pixel 110 belonging to the first pixel group, the isolated spacer 203 placed in the sub-pixel 106 is shifted to the vicinity of one side edge of this sub-pixel 106 or to the vicinity of the other side edge thereof along the x direction. The spacers 203 are alternately located at these two positions along the x direction.

Similarly, in each unit pixel 110 belonging to the second pixel group, the isolated spacer 203 placed in the sub-pixel 107 is shifted to the vicinity of one side edge of this sub-pixel 107 or to the vicinity of the other side edge thereof along the x direction. The spacers 203 are alternately located at these two positions along the x direction.

These are the same as the structure of FIG. 19; however, the structure of FIG. 20 has the following difference from the structure of FIG. 19. Specifically, as seen from FIG. 20, the arrangement of the spacers 203 in the third row and that of the spacers 203 in the fourth row are inverted with respect to the arrangement of the spacers 203 in the first row and that of the spacers 203 in the second row.

In the pixel structure of FIG. 20, the sixteen unit pixels 110 included in four rows and four columns of the matrix adjacent to each other, i.e., the (4×4) unit pixels 110, compensates the effect of the defective alignment regions 108, 108a, and 108b.

With the display device according to the fourth embodiment and its variation, two or more spacer positions, to which the spacers 203 are to be placed, are prepared in advance in the sub-pixel 106 for the left eye and the sub-pixel 107 for the right eye, respectively. Thereafter, one spacer 203 is actually placed at one of the spacer positions thus prepared in each of the sub-pixels 106 and 107. The actual placement positions of the spacers 203 are changed every row and/or every column of the matrix. In this way, the effect of the defective alignment regions 108, 108a, and 108b can be suppressed.

Moreover, since the effect of the spacers 203 can be decreased when the pixel resolution is high, there is an advantage that higher display quality is obtainable in addition to the same advantages as those of the aforementioned first embodiment.

With the display device according to the fourth embodiment and its variation also, as long as the gag uniformity between the main substrate 101 and the opposite substrate 201 is kept, the spacers 203 may be arranged in such a way that one or more sub-pixels 106 and/or 107 including no spacer is/are located between the adjacent spacers 203 along the rows and/or columns of the matrix.

Fifth Embodiment

Figure 21:
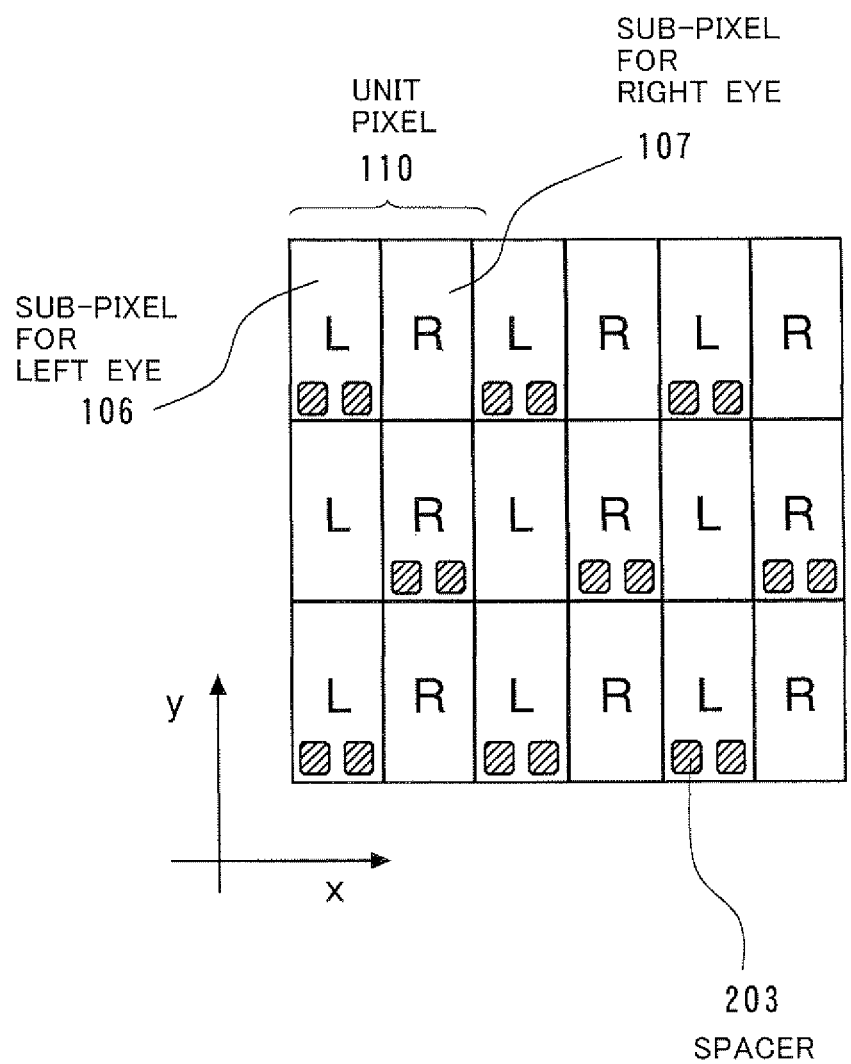
FIG. 21 is a partial explanatory plan view showing the pixel structure of the display panel used in a display device according to a fifth embodiment of the invention, where two spacers are placed in each sub-pixel.
Figure 22:
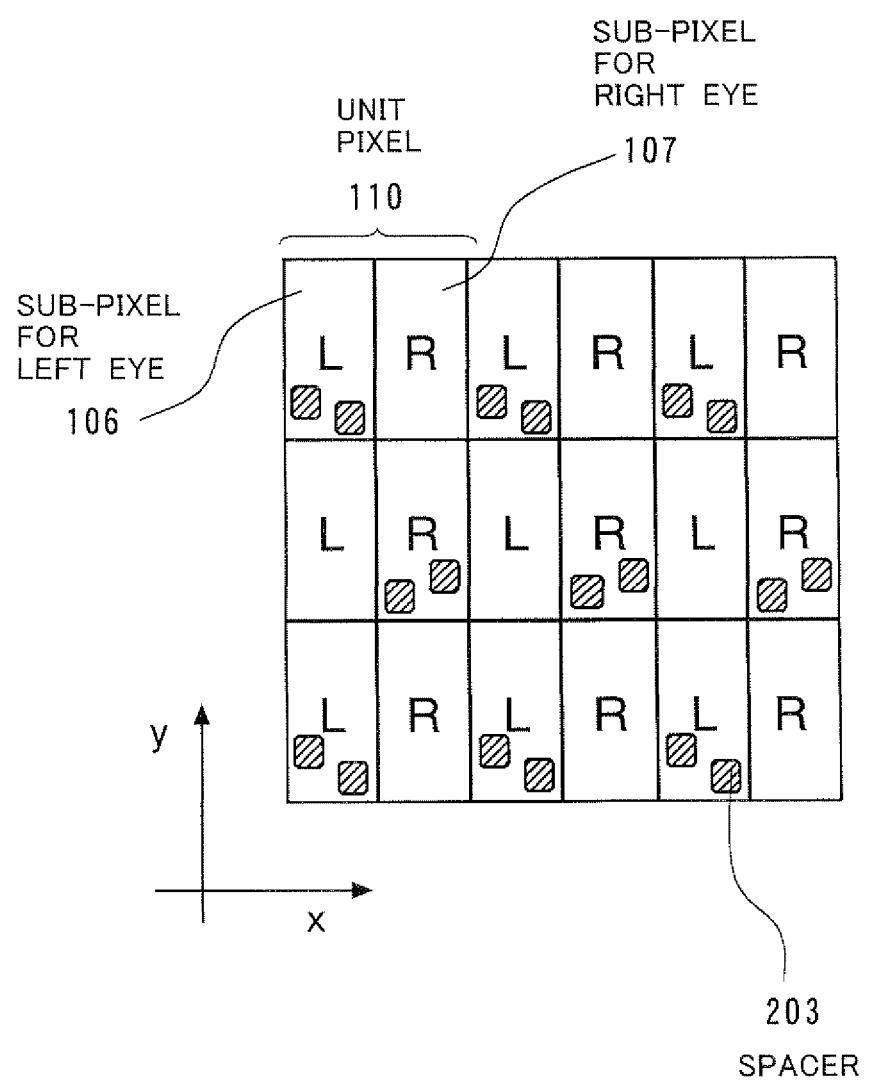
FIG. 22 is a partial explanatory plan view showing a variation of the pixel structure of the display panel used in the display device according to the fifth embodiment of the invention, where two spacers are placed in each sub-pixel in such a way as to be shifted to each other

FIG. 21 shows the pixel structure of the display panel used in a display device according to a fifth embodiment of the present invention. FIG. 22 shows a variation of the pixel structure of this display panel.

The structure of FIG. 21 is the same as the structure of FIG. 17 according to the aforementioned third embodiment except that two isolated spacers 203 are formed in the sub-pixel 106 for the left eye or the sub-pixel 107 for the right eye of each unit pixel 110. These two isolated spacers 203 formed in the sub-pixel 106 or 107 are aligned along the row direction of the matrix (i.e., the x direction) and apart from each other.

The structure of FIG. 22 is the same as the structure of FIG. 21 except that the two isolated spacers 203 formed in the sub-pixel 106 or 107 are slightly shifted to each other along the column direction of the matrix (i.e., the y direction). Here, the isolated spacer 203 located at the left in the sub-pixel 106 is shifted upward with respect to the isolated spacer 203 located at the right in the same sub-pixel 106. On the other hand, the isolated spacer 203 located at the right in the sub-pixel 107 is shifted upward with respect to the isolated spacer 203 located at the left in the same sub-pixel 107.

When the pixel resolution becomes high, there arise restrictions as to the spacer positions to which the spacers 203 can be placed in each unit pixel 110 or each sub-pixel 106 or 107. For this reason, to ensure the gap uniformity between the substrates 101 and 201, it is preferred to form the small-sized spacers 203 at various positions in the sub-pixel 106 or 107 according to the necessity, as shown in the said fifth embodiment and its variation. Accordingly, the display device according to the fifth embodiment and its variation have an advantage that the gap uniformity can be enhanced in addition to the same advantages as those of the aforementioned first embodiment.

With the display device according to the fifth embodiment and its variation also, as long as the gag uniformity between the main substrate 101 and the opposite substrate 201 is kept, the spacers 203 may be arranged in such a way that one or more sub-pixels 106 and/or 107 including no spacer is/are located between the adjacent spacers 203 along the rows and/or columns of the matrix.

Sixth Embodiment

Figure 23A:
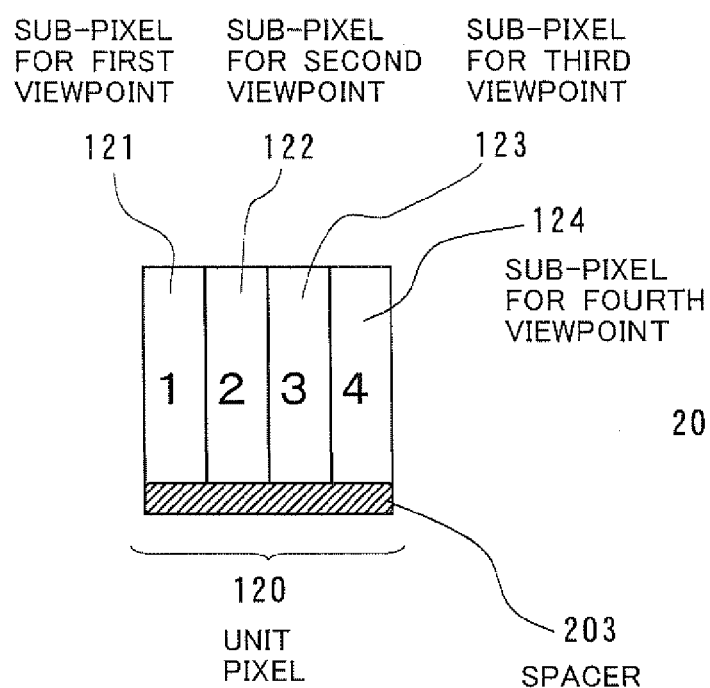
FIG. 23A is an explanatory plan view showing the pixel structure of the display panel used in a display device according to a sixth embodiment of the invention, where each unit pixel includes four sub-pixels for the first to fourth viewpoints, and one spacer is extended to overlap with these four sub-pixels in the form of a stripe.
Figure 23B:
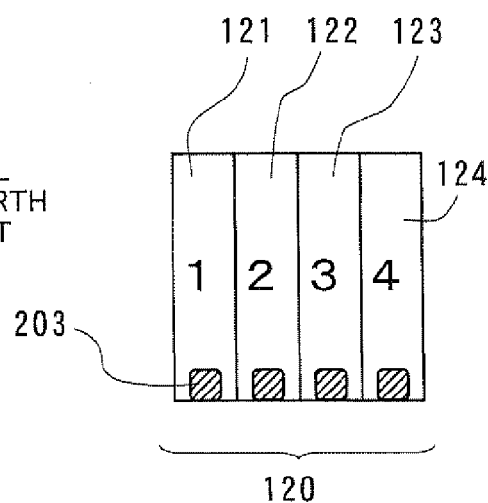
FIG. 23B is an explanatory plan view showing a first variation of the pixel structure of the display panel used in the display device according to the sixth embodiment of the invention, where each of the four sub-pixels includes one spacer.
Figure 23C:
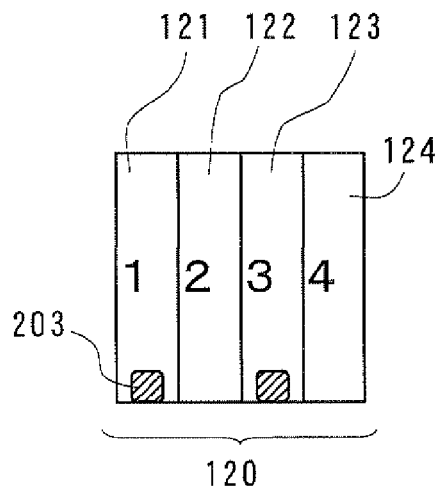
FIG. 23C is an explanatory plan view showing a second variation of the pixel structure of the display panel used in the display device according to the sixth embodiment of the invention, where the sub-pixels for the first and third viewpoints includes one spacer while the sub-pixels for the second and fourth viewpoints includes no spacer.
Figure 23D:
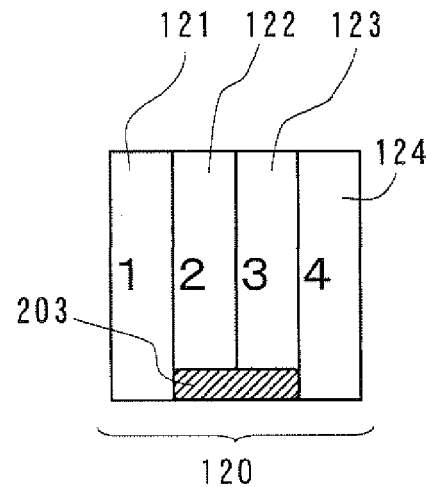
FIG. 23D is an explanatory plan view showing a third variation of the pixel structure of the display panel used in the display device according to the sixth embodiment of the invention, where one spacer is extended to overlap with the two sub-pixels for the second and third viewpoints in the form of stripe while the sub-pixels for the first and fourth viewpoints includes no spacer.

FIG. 23A shows the pixel structure of the display panel used in a display device according to a sixth embodiment of the present invention. FIGS. 23B to 23D show first to third variations of the pixel structure of this display panel, respectively. FIG. 24 shows a fourth variation of the pixel structure of this display panel. This embodiment and its variations are designed for displaying different images for four viewpoints.

With the structure of FIG. 23A, which is the basic structure of the unit pixel 120 for four viewpoints, the unit pixel 120 is formed by a sub-pixel 121 for the first viewpoint, a sub-pixel 122 for the second viewpoint, a sub-pixel 123 for the third viewpoint, and a sub-pixel 121 for the fourth viewpoint aligned along one direction. One spacer 203 is placed at the lower ends of the four sub-pixels 121, 122, 123, and 124, and is extended along the sub-pixel arrangement direction in such a way as to be stripe-shaped. Therefore, it may be said that one spacer 203 is assigned to the unit pixel 120.

With the structure of FIG. 23B, four isolated spacers 203 are respectively assigned to the four sub-pixels 121, 122, 123, and 124. In other words, the unit pixel 120 includes the four isolated spacers 203. These spacers 203 are respectively placed at the lower ends of the sub-pixels 121, 122, 123, and 124.

With the structure of FIG. 23C, two isolated spacers 203 are respectively assigned to the two sub-pixels 121 and 123, where the two remaining sub-pixels 122 and 124 include no spacer. In other words, the unit pixel 120 includes the two isolated spacers 203. These spacers 203 are respectively placed at the lower ends of the sub-pixels 121 and 123.

With the structure of FIG. 23D, one isolated spacer 203 is formed to overlap with the two sub-pixels 122 and 123, where the two remaining sub-pixels 121 and 124 include no spacer. The single spacer 203 is placed at the lower ends of the sub-pixels 122 and 123, and is extended along the sub-pixel arrangement direction in such a way as to be stripe-shaped.

With the structure of FIG. 24, one isolated spacer 203 is formed in one of the four sub-pixels 121, 122, 123, and 124 of each unit pixel 120, where the three remaining sub-pixels include no spacer. The single spacer 203 is placed at the lower end of the sub-pixel 121, 122, 123, or 124.

The unit pixels 120 each including the spacer 203 in the sub-pixel 122 and the unit pixels 110 each including the spacer 203 in the sub-pixel 121 are alternately arranged along one row of the matrix (i.e., the x direction), which constitute the first pixel group. The unit pixels 120 each including the spacer 203 in the sub-pixel 124 and the unit pixels 120 each including the spacer 203 in the sub-pixel 123 are alternately arranged along another adjacent row of the matrix (i.e., the x direction), which constitute the second pixel group. The unit pixels 120 in the first group and the unit pixels 120 in the second pixel group are alternately arranged along the y direction (i.e., the columns of the matrix).

The four unit pixels 120 included in two rows and two columns of the matrix adjacent to each other, i.e., the (2×2) unit pixels 120, compensates the effect of the defective alignment regions 108, 108a, and 108b induced by the spacers 203.

With the display devices according to the sixth embodiment and the first to fourth variations thereof, the same advantages as those of the aforementioned first embodiment are obtainable.

Although the pixel structures according to the sixth embodiment and its first to fourth variations are designed for four viewpoints, they may be applied to any display device designed for two or more viewpoints other than the four viewpoints.

Seventh Embodiment

Figure 25:
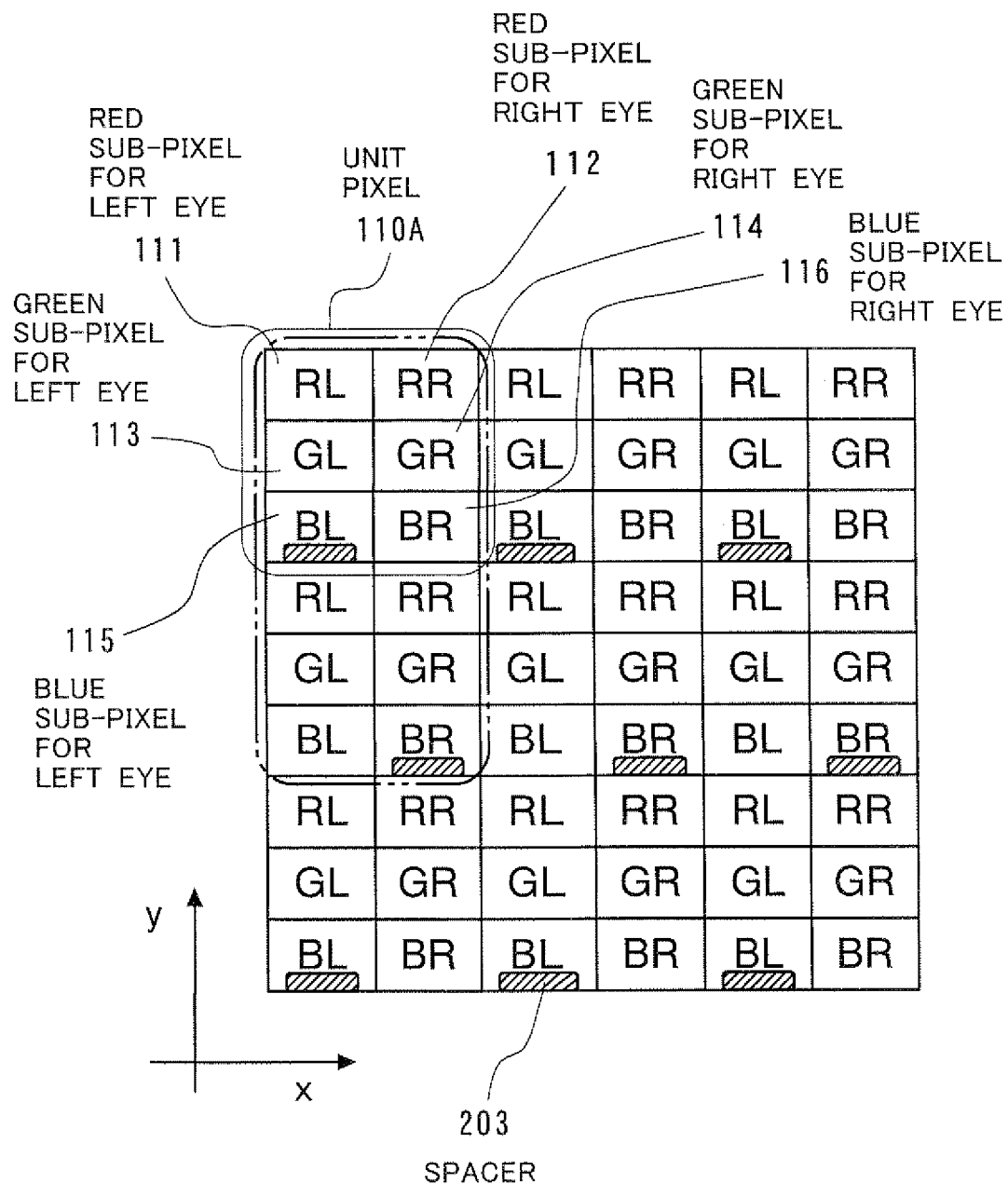
FIG. 25 is an explanatory plan view showing the pixel structure of the display panel used in a color display device according to a seventh embodiment of the invention, where each unit pixel includes six sub-pixels for the left and right eyes and red, green, and blue colors, and the sub-pixels for the blue color includes one spacer.
Figure 26:
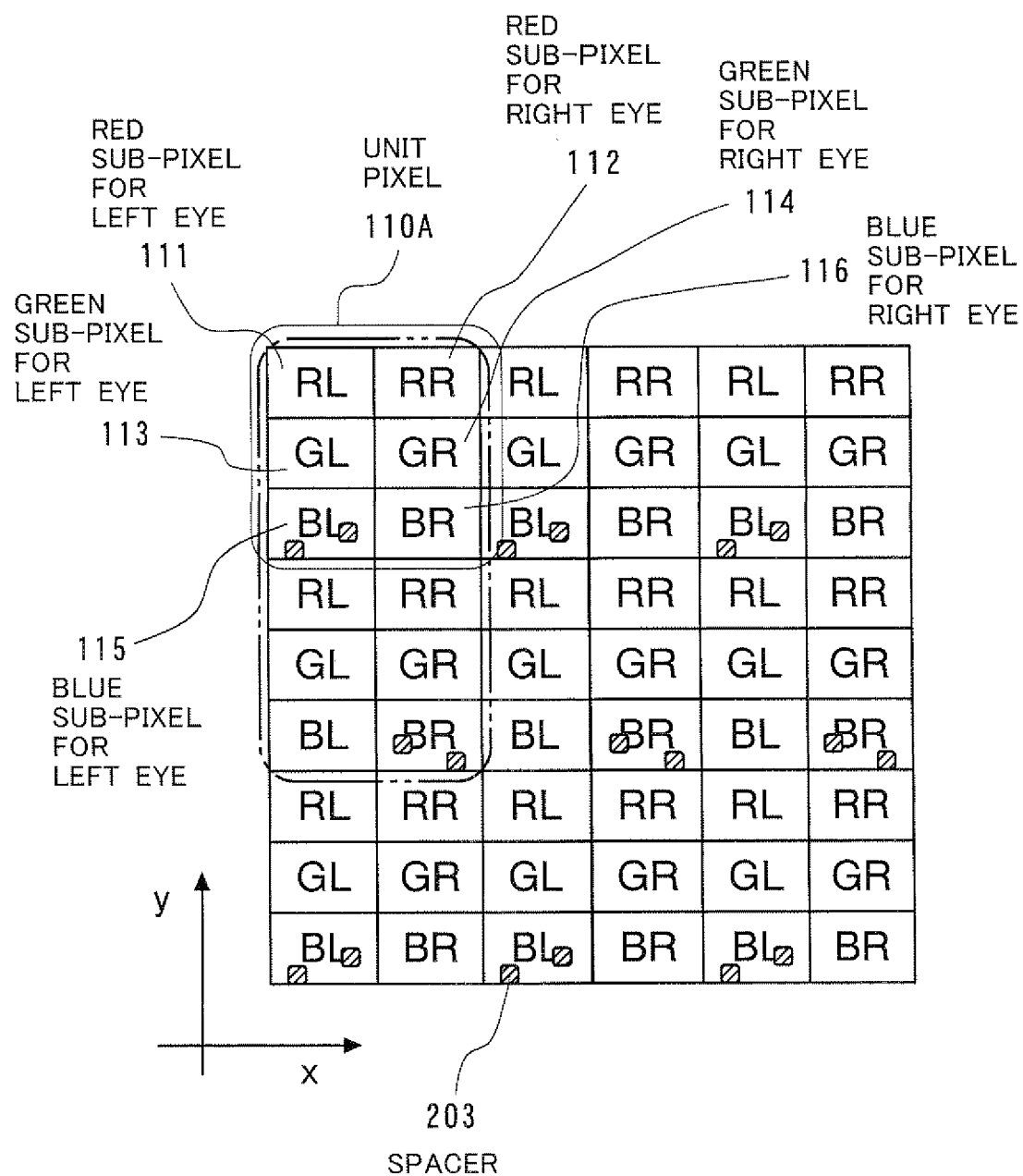
FIG. 26 is an explanatory plan view showing a variation of the pixel structure of the display panel used in the color display device according to the seventh embodiment of the invention, which corresponds to the pixel structure of FIG. 17.

FIG. 25 shows the pixel structure of the display panel used in a display device according to a seventh embodiment of the present invention. FIG. 26 shows a variation of the pixel structure of this display panel. These two structures are designed for displaying color images.

With the structure of FIG. 25, the unit pixel 110A is formed by a red sub-pixel 111 for the left eye, a red sub-pixel 112 for the right eye, a green sub-pixel 113 for the left eye, a green sub-pixel 114 for the right eye, a blue sub-pixel 115 for the left eye, and a blue sub-pixel 116 for the right eye, which are adjacent to each other.

The red sub-pixel 111 for the left eye and the red sub-pixel 112 for the right eye are aligned along one row of the matrix (i.e., the x direction). The green sub-pixel 113 for the left eye and the green sub-pixel 114 for the right eye are aligned along another adjacent row of the matrix (i.e., the x direction). The blue sub-pixel 115 for the left eye and the blue sub-pixel 116 for the right eye are aligned along still another adjacent row of the matrix (i.e., the x direction). The red sub-pixel 111, the green sub-pixel 113, and the blue sub-pixel 115 for the left eye are aligned along a column of the matrix (i.e., the y direction). The red sub-pixel 112, the green sub-pixel 114, and the blue sub-pixel 116 for the right eye are aligned along another adjacent column of the matrix (i.e., the y direction).

One isolated spacer 203 is placed at the lower end of the blue sub-pixel 115 for the left eye or the blue sub-pixel 116 for the right eye in each unit pixel 110A. In the unit pixel 110A including the spacer 203 in the blue sub-pixel 115, each of the remaining sub-pixels 111, 112, 113, 114, and 116 includes no spacer. In the unit pixel 110A including the spacer 203 in the blue sub-pixel 116, each of the remaining sub-pixels 111, 112, 113, 114, and 115 includes no spacer.

The unit pixels 110A each including the isolated spacer 203 in the sub-pixel 115 are arranged along one row of the matrix (i.e., the x direction), which constitute the first pixel group. The unit pixels 110A each including the isolated spacer 203 in the sub-pixel 116 are arranged along another adjacent row of the matrix (i.e., the x direction), which constitute the second pixel group. The unit pixels 110A in the first group and the unit pixels 110A in the second pixel group are alternately arranged along the y direction (i.e., the columns of the matrix).

The two unit pixels 110A included in two rows and one column of the matrix adjacent to each other, i.e., the (2×1) unit pixels 110A, compensates the effect of the defective alignment regions 108, 108a, and 108b induced by the spacers 203.

With the structure of FIG. 26, the unit pixel 110A has the same structure as that of FIG. 25 except that two isolated spacers 203 are formed in the sub-pixel 115 or 116 and that these two spacers 203 are slightly shifted to each other along the column direction of the matrix (i.e., the y direction). The spacers 203 in FIG. 26 are smaller than the spacers 203 in FIG. 25. Here, the isolated spacer 203 located at the right in the sub-pixel 115 is shifted upward with respect to the isolated spacer 203 located at the left in the same sub-pixel 115. On the other hand, the isolated spacer 203 located at the left in the sub-pixel 116 is shifted upward with respect to the isolated spacer 203 located at the right in the same sub-pixel 116.

The unit pixels 110A each including the isolated spacers 203 in the sub-pixel 115 are arranged along one row of the matrix (i.e., the x direction), which constitute the first pixel group. The unit pixels 110A each including the isolated spacers 203 in the sub-pixel 116 are arranged along another adjacent row of the matrix (i.e., the x direction), which constitute the second pixel group. The unit pixels 110A in the first group and the unit pixels 110A in the second pixel group are alternately arranged along the y direction (i.e., the columns of the matrix).

Similar to the structure of FIG. 25, the two unit pixels 110A included in two rows and one column of the matrix adjacent to each other, i.e., the (2×1) unit pixels 110A, compensates the effect of the defective alignment regions 108, 108a, and 108b induced by the spacers 203.

With the display device according to the seventh embodiment and its variation, any one of the arrangements of the spacers 203 shown in the aforementioned first to sixth embodiments may be selectively used.

It is preferred that the green sub-pixel 113 or 114 is used as the color layer on which the spacer(s) 203 is/are placed. This is because green has the highest visibility within red, green, and blue colors. In this case, the green sub-pixels 113 or 114 are preferably formed in such a way as not to overlap with the defective alignment regions 108, 108a, and 108b. It is preferred that the sub-pixels for the left and right eyes for each color (i.e., red, green or blue) are arranged along the x direction.

With the display devices according to the seventh embodiment and the variation thereof, the same advantages as those of the aforementioned first embodiment are obtainable.

Eighth Embodiment

Figure 27:
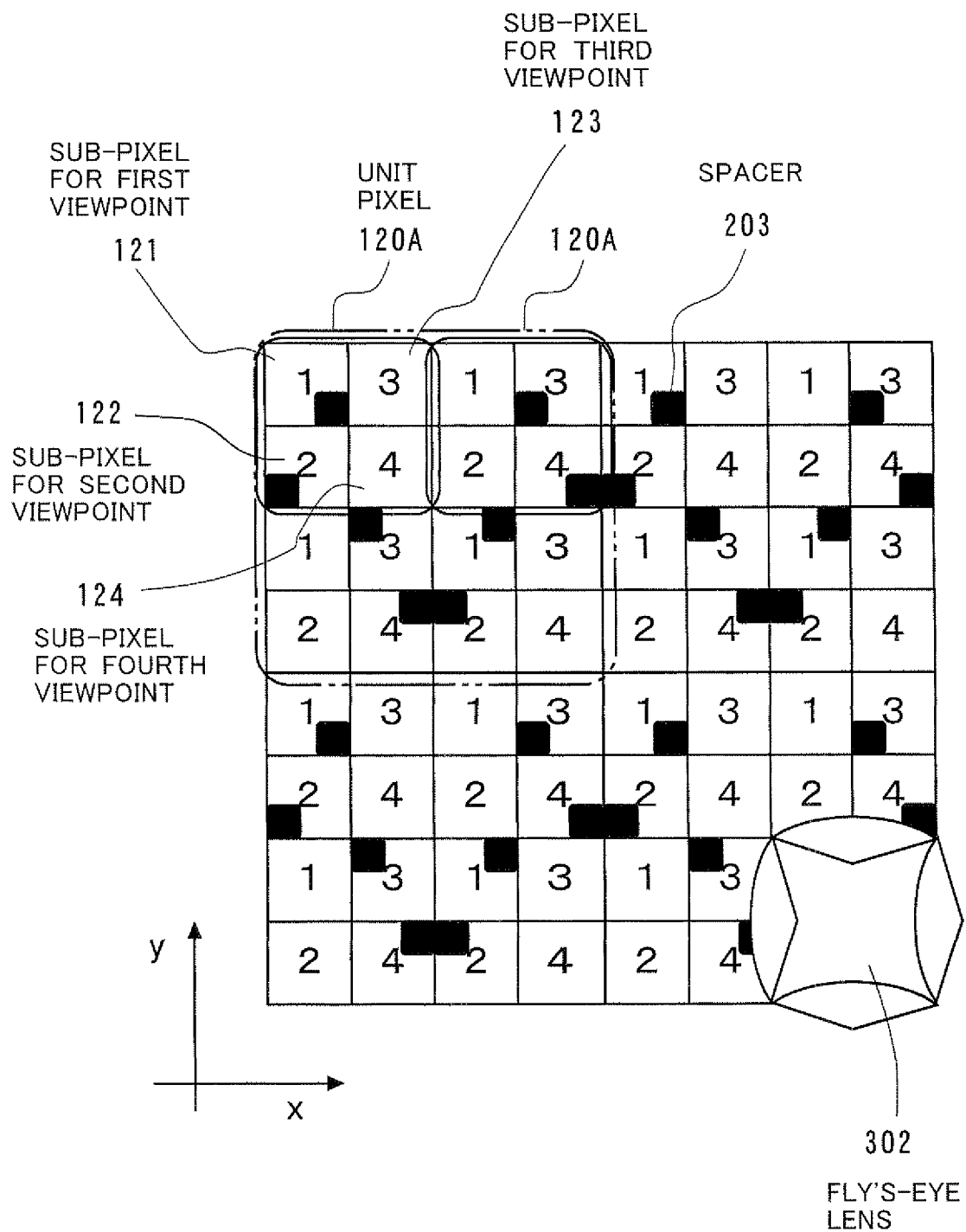
FIG. 27 is an explanatory plan view showing the pixel structure of the display panel used in a display device according to an eighth embodiment of the invention, where a fly's eye lens is used as the optical image separation element, and each unit pixel includes four sub-pixels for the first to fourth viewpoints.

FIG. 27 shows the pixel structure of the display panel used in a display device according to an eighth embodiment of the present invention. This embodiment is an example of the display devices designed for displaying images for four viewpoints using a fly's eye lens as the optical image separation element. An incoming image is separated into outgoing images by the fly's eye lens, and the outgoing images thus generated are emitted along not only the x direction but also the y direction.

As seen from FIG. 27, each unit pixel 120A is formed by four sub-pixels, i.e., a sub-pixel 121 for the first viewpoint, a sub-pixel 122 for the second viewpoint, a sub-pixel 123 for the third viewpoint, and a sub-pixel 121 for the fourth viewpoint. The sub-pixels 121 and 123 are aligned along one row of the matrix (i.e., the x direction). The sub-pixels 122 and 124 are aligned along another adjacent row of the matrix (i.e., the x direction). The sub-pixels 122 and 124 are located just below the sub-pixels 121 and 123, respectively. Each of the sub-pixels 121, 122, 123, and 124 is square. Each spacer 203 used for this embodiment is also square.

Some of the sub-pixels 121 for the first viewpoint include spacers 203 and others of the sub-pixels 121 include no spacer. The single spacer 203 is placed at the lower right corner or the upper right corner of the sub-pixel 121.

Some of the sub-pixels 122 for the second viewpoint include spacers 203 and others of the sub-pixels 121 include no spacer. The single spacer 203 is placed at the lower left corner or the upper left corner of the sub-pixel 122.

Some of the sub-pixels 123 for the third viewpoint include spacers 203 and others of the sub-pixels 123 include no spacer. The single spacer 203 is placed at the lower left corner or the upper left corner of the sub-pixel 123.

Some of the sub-pixels 124 for the fourth viewpoint include spacers 203 and others of the sub-pixels 124 include no spacer. The single spacer 203 is placed at the lower right corner or the upper right corner of the sub-pixel 124.

The four unit pixels 120A included in two rows and two columns of the matrix adjacent to each other, i.e., the (2×2) unit pixels 120A, compensates the effect of the defective alignment regions 108, 108a, and 108b induced by the spacers 203.

With the display device according to the eighth embodiment, incoming light is divided and emitted along not only the x direction but also the y direction and therefore, it is necessary to compensate the effect of the defective alignment regions 108, 108a, and 108b along both the x and y directions. To compensate this effect, any one of the arrangements of the spacers 203 shown in the aforementioned first to seventh embodiments may be selectively used.

It is apparent that the same advantages as those of the aforementioned first embodiment are obtainable in the display device according to the eighth embodiment.

The pitch of the fly's eye lens 302 and the pitch of the unit pixels 120A may be different from each other in accordance with the observation distance.

Any other optical image separation element than the fly's eye lens 302 may be used.

Variations

The above-described first to eighth embodiments and their variations are preferred examples of the present invention. Therefore, it is needless to say that the present invention is not limited to these embodiments and their variations and that any other modification is applicable to them.

For example, the black matrix 202 for light-shielding is formed on the opposite substrate 201 in the above-described first to eighth embodiments of the invention. However, the black matrix 202 may be omitted for enhancing the aperture ratio.

Moreover, although the display panel has a LCD panel structure in the above-described first to eighth embodiments of the invention, the display panel may have any other structure than the LCD panel, e.g., an organic EL (electroluminescent) display panel, if it comprises columnar spacers arranged in the gap between a pair of substrates.

Although the lenticular lens 301 or the fly's eye lens 302 is used in the above-described first to eighth embodiments of the invention, any other optical image separation element may be used for this purpose.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A display device comprising:
   a display panel having unit pixels arranged in a matrix array, each of the unit pixels including at least a first sub-pixel for a first viewpoint and a second sub-pixel for a second viewpoint;
   an optical image separation element for separating an incoming image generated by the first sub-pixel and the second sub-pixel into two outgoing images and for emitting respectively the outgoing images toward the first viewpoint and the second viewpoint; and
   the display panel comprising a pair of substrates coupled to each other to have a predetermined gap, and spacers arranged at predetermined positions in the gap,
   wherein the spacers keep the pair of substrates at the predetermined gap;
   wherein the spacers are stripe-shaped in such a way as to be extended along a direction perpendicular to an image separation axis of the optical image separation element; and
   wherein the spacers are equally overlapped with the first sub-pixel and the second sub-pixel of each of the unit pixels.

2. The display device according to claim 1, wherein the spacers are continuously extended over the unit pixels adjacent to each other.

3. The display device according to claim 1, wherein the spacers are isolated for the respective unit pixels, the respective first sub-pixels, or the respective second sub-pixels.

4. The display device according to claim 1, wherein when the optical image separation element is a lenticular lens constituted by connecting lens elements, a size of the defective alignment region is defined as A, an arrangement pitch and a focal length of the lens element are respectively defined as L and f, and a distance between the lens element and the corresponding unit pixel is defined as H, the distance H is set to satisfy the following relationship $$f < L \times H/(L+A).$$

5. A terminal unit comprising:
   the display device according to claim 1.

6. A display device comprises:
   a display panel having unit pixels arranged in a matrix array, each of the unit pixels including at least a first sub-pixel for a first viewpoint and a second sub-pixel for a second viewpoint;
   an optical image separation element for separating an incoming image generated by the first sub-pixel and the second sub-pixel into two outgoing images and for emitting respectively the outgoing images toward the first viewpoint and the second viewpoint; and
   the display panel comprising a pair of substrates coupled to each other to have a predetermined gap, and spacers arranged at predetermined positions in the gap, wherein the spacers keep the pair of substrates at the predetermined gap;
   wherein the spacers are isolated for each of the pixel units, the first sub-pixels for the first viewpoint, or the second sub-pixels for the second viewpoint, and are arranged along a direction perpendicular to an image separation axis of the optical image separation element; and
   the isolated spacers assigned to the first sub-pixel and the second sub-pixel that constitute each of the unit pixels are symmetrically arranged with respect to a boundary between the said first sub-pixel and the said second sub-pixel.

7. The display device according to claim 6, wherein one of the spacers is placed in the first sub-pixel of the unit pixel and another of the spacers is placed in the second sub-pixel thereof.

8. The display device according to claim 6, wherein two or more of the spacers are placed in the first sub-pixel of the unit pixel and other two or more of the spacers are placed in the second sub-pixel thereof.

9. The display device according to claim 6, wherein two or more of the spacers are placed in the first sub-pixel of the unit pixel, and other two or more of the spacers are placed in the second sub-pixel thereof;
   and wherein the spacers placed in each of the first and second sub-pixels are shifted to each other along the direction perpendicular to the image separation axis of the optical image separation element.

10. A display device comprising:
    a display panel having unit pixels arranged in a matrix array, each of the unit pixels including at least a first sub-pixel for a first viewpoint and a second sub-pixel for a second viewpoint;
    an optical image separation element for separating an incoming image generated by the first sub-pixel and the second sub-pixel into two outgoing images and for emitting respectively the outgoing images toward the first viewpoint and the second viewpoint; and
    the display panel comprising a pair of substrates coupled to each other to have a predetermined gap, and spacers arranged at predetermined positions in the gap, wherein the spacers keep the pair of substrates at the predetermined gap;
    wherein the unit pixels are separated into a first group including the spacers and a second group including no spacer;
    wherein the spacers placed in the unit pixels of the first group are isolated for each of the pixel units, the first sub-pixels for the first viewpoint, or the second sub-pixels for the second viewpoint, and are arranged along a direction perpendicular to an image separation axis of the optical image separation elements; and
    wherein the unit pixels of the first group and the unit pixels of the second group adjacent to each other are arranged in such a way as to compensate an effect of defective alignment regions induced by the spacers.

11. The display device according to claim 10, wherein the unit pixels of the first group are arranged along part of the columns of the matrix, and the unit pixels of the second group are arranged along the remainder of the columns of the matrix;

and wherein the unit pixels of the first group and the unit pixels of the second group are alternately arranged along the rows of the matrix.

12. The display device according to claim 10, wherein the unit pixels of the first group are arranged along part of the rows of the matrix, and the unit pixels of the second group are arranged along the remainder of the rows of the matrix;

and wherein the unit pixels of the first group and the unit pixels of the second group are alternately arranged along the columns of the matrix.

13. The display device according to claim 10, wherein the unit pixels of the first group and the unit pixels of the second group are alternately arranged along the rows and columns of the matrix in such a way as to form a checkered pattern.

14. The display device according to claim 10, wherein one of the spacers is placed in each of the unit pixels of the first group.

15. The display device according to claim 10, wherein two or more of the spacers are placed in each of the unit pixels of the first group.

16. The display device according to claim 10, wherein two or more of the spacers are placed in each of the unit pixels of the first group;

and wherein the spacers are shifted to each other along the direction perpendicular to the image separation axis of the optical image separation element in each of the unit pixels.

17. A display device comprising:

a display panel having unit pixels arranged in a matrix array, each of the unit pixels including at least a first sub-pixel for a first viewpoint and a second sub-pixel for a second viewpoint;

an optical image separation element for separating an incoming image generated by the first sub-pixel and the second sub-pixel into two outgoing images and for emitting respectively the outgoing images toward the first viewpoint and the second viewpoint; and the display panel comprising a pair of substrates coupled to each other to have a predetermined gap, and spacers arranged at predetermined positions in the gap, wherein the spacers keep the pair of substrates at the predetermined gap;

wherein the unit pixels are separated into a first group including the spacers placed in the first sub-pixels and a second group including the spacers placed in the second sub-pixels;

wherein the spacers placed in the unit pixels of the first group are isolated for each of the first sub-pixels, and are arranged along a direction perpendicular to an image separation axis of the optical image separation element;

wherein the spacers placed in the unit pixels of the second group are isolated for each of the second sub-pixels, and are arranged along the direction perpendicular to the image separation axis of the optical image separation element; and wherein the unit pixels of the first group and the unit pixels of the second group adjacent to each other are arranged in such a way as to compensate an effect of defective alignment regions induced by the spacers.

18. The display device according to claim 17, wherein the unit pixels of the first group are arranged along part of the columns of the matrix, and the unit pixels of the second group are arranged along the remainder of the columns of the matrix;

and wherein the unit pixels of the first group and the unit pixels of the second group are alternately arranged along the rows of the matrix.

19. The display device according to claim 17, wherein the unit pixels of the first group are arranged along part of the rows of the matrix, and the unit pixels of the second group are arranged along the remainder of the rows of the matrix;

and wherein the unit pixels of the first group and the unit pixels of the second group are alternately arranged along the columns of the matrix.

20. The display device according to claim 17, wherein the unit pixels of the first group and the unit pixels of the second group are alternately arranged along the rows and columns of the matrix in such a way as to form a checkered pattern.

21. The display device according to claim 17, wherein one of the spacers is placed in each of the unit pixels of the first group and the unit pixels of the second group.

22. The display device according to claim 17, wherein two or more of the spacers are placed in each of the unit pixels of the first group and the unit pixels of the second group.

23. The display device according to claim 17, wherein two or more of the spacers are placed in each of the unit pixels of the first group and the unit pixels of the second group;

and wherein the spacers are shifted to each other along the direction perpendicular to the image separation axis of the optical image separation element in each of the unit pixels.

\* \* \* \* \*